(12) United States Patent
Metral

(10) Patent No.: US 10,122,822 B2
(45) Date of Patent: Nov. 6, 2018

(54) DATA EXCHANGE SCHEMAS

(71) Applicant: PAYPAL, INC., San Jose, CA (US)

(72) Inventor: Max Edward Metral, Brookline, MA (US)

(73) Assignee: PAYPAL, INC., San Jose, CA (US)

( * ) Notice: Subject to any disclaimer, the term of this patent is extended or adjusted under 35 U.S.C. 154(b) by 273 days.

(21) Appl. No.: 14/979,920

(22) Filed: Dec. 28, 2015

(65) Prior Publication Data

US 2017/0187825 A1  Jun. 29, 2017

(51) Int. Cl.
*H04L 29/08* (2006.01)
*H04L 29/06* (2006.01)

(52) U.S. Cl.
CPC .............. *H04L 67/32* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 2006/0058011 A1* | 3/2006 | Vanska | ............. | G06Q 30/0222 455/414.3 |
| 2014/0149529 A1* | 5/2014 | McLellan | ........... | H04L 67/1097 709/213 |
| 2015/0149449 A1* | 5/2015 | Dhandapani | ...... | G06F 17/30106 707/722 |
| 2015/0207701 A1* | 7/2015 | Faaborg | .................. | H04L 67/18 709/224 |
| 2016/0210699 A1* | 7/2016 | Meoli | ..................... | H04L 67/42 |

* cited by examiner

*Primary Examiner* — Natisha D Cox
(74) *Attorney, Agent, or Firm* — Haynes and Boone, LLP

(57) ABSTRACT

Various systems, mediums, and methods herein describe aspects of data exchange schemas accessible with client devices over communication networks in data infrastructures. A data exchange system may build one or more data exchange schemas for a user. The system may also determine a location of a client device of the user associated with one or more entities. Based on the location of the client device, the system may identify a data exchange schema of the user for transferring data to the one or more entities. The system may determine an access for the one or more entities to a portion of data from the data exchange schema of the user. The system may also transmit a notification to the client device that indicates the access of the one or more entities to the portion of data from the data exchange schema.

20 Claims, 12 Drawing Sheets

DATA EXCHANGE SCHEMAS

TECHNICAL FIELD

This disclosure generally relates to data exchange schemas accessible by various devices over one or more communication networks.

BACKGROUND

With the advent of modern technology, users are increasingly transferring their data to various entities over one or more communication networks. For example, a user may be able to utilize their smartphone to provide their name, address, and/or telephone number to numerous entities over various communication networks efficiently, possibly within seconds. As such, various advancements to mobile technology and the data infrastructure have enabled the user to accomplish such tasks without major technical difficulties and/or complications. Yet, with such conveniences provided with these technological advancements, a number of drawbacks may emerge as well.

In various circumstances, users may have difficulties managing their data. For example, the user described above may have difficulty tracking which entities have their data, particularly their name, address, telephone number, and/or other types of data of the user. In particular, the user may find it challenging to remember prior instances where the user may have transferred their data to a number of such entities. Further, these challenges may be further experienced based on the user providing data to various such entities over longer periods of time, such as a number of years. Thus, the user may be left without recognizing which entities may have their data, what types of data the entities may have accumulated from the user over the years, and/or how the data may be used by such entities, among other possible uncertainties.

As demonstrated in the scenario above, there is much need for technological advancements to support the management of data with the utilization of various aspects of mobile technology and the capabilities of the data infrastructure.

Figure 1A:
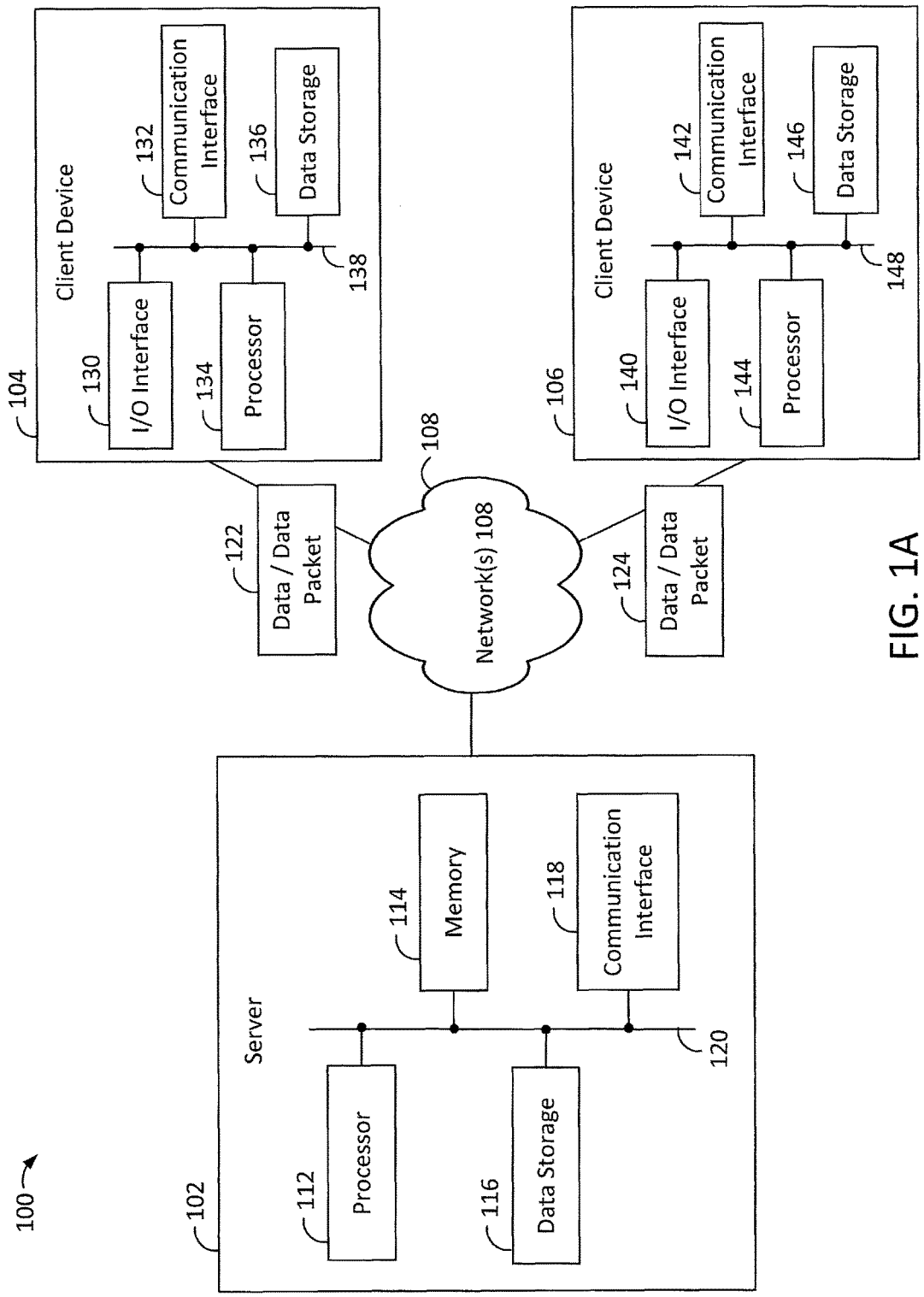
FIG. 1A is a block diagram of an exemplary system, according to an embodiment.

Embodiments of the present disclosure and their advantages may be understood by referring to the detailed description herein. It should be appreciated that reference numerals may be used to illustrate various elements and features provided in the figures. Further, the figures may illustrate various examples for purposes of illustration and explanation related to the embodiments of the present disclosure and not for purposes of any limitation.

DETAILED DESCRIPTION

In some embodiments, a data exchange system may be configured to perform operations related to data anonymization, particularly to protect various privacy interests of a user. In particular, the data exchange system may manage user data in a number of data exchange schemas. In some instances, the data exchange schemas may include secure databases configured to maintain, manage, and/or organize data for a user, possibly based on the various types of data recognized by the system. Notably, the data exchange system may also manage the data exchange schemas with or without user inputs to optimize the anonymization of the user data. As such, the data exchange system may compile various types of data associated with a user in a number of data exchange schemas.

In practice, for example, consider a scenario where a user visits a doctor's office. For illustrative purposes, further consider that the user carries a smartphone and the data exchange system identifies the user's location at the doctor's office, possibly based on retrieving the smartphone's global positioning system (GPS) data over the network. As such, the system may identify a particular data exchange schema, such as an Extensible Markup Language (XML) schema, associated with the user visiting the doctor's office. In particular, the system may identify the particular schema from a number of different schemas developed for the user. For example, there may be a data exchange schema associated with the user going to a store, such as a grocery store, a clothing store, a hardware store, a restaurant, and/or the user's school, among other possible locations where data may be exchanged or transferred with the user.

In some instances, the data exchange system may search for data in the one or more data exchange schemas identified. For example, considering the scenario above with the doctor's office, the system may search for data indicating the user's name, address, birthdate, age, gender, height, weight, temperature, blood pressure, allergies, medical card information or other health information, medical history, medications/prescriptions taken, and/or other forms of data related to the user visiting the doctor's office. As such, the system may provide or display such data on the smartphone, possibly to allow the user to change the data. For example, the user may add a number of symptoms the user may have at the present time, which may be the basis for the visit to the doctor's office. Thus, the data may be provided to the doctor's office in one or more formats that the office may prefer. Notably, the user is not required to fill out any forms, answer questions, and/or take part in conventional practices that may be time consuming or inconvenient under the circumstances.

In some embodiments, the data exchange system provides an access to the data described above in the one or more particular data exchange schemas. In some instances, the access may be a limited access to the data, possibly based on a number of controls and/or rules identified by the system. For example, the system may send an electronic message (e.g., an email and/or a short message service (SMS) message) to the doctor's office with a link to the data. Yet, the link may expire after a given time period set based on the system detecting the smartphone's location to be at the doctor's office. Further, in some instances, the system may send the data to the doctor's office and then retrieve and/or remove the data from the databases of the doctor's office based on detecting the user has left the doctor's office. For example, the system may remove the data from the doctor's databases to help ensure that the user remains anonymous from other entities that may be interested in the user's data. As such, the doctor's office may be prevented from transferring the data to other entities for purposes other than those related to the medical interests of the user.

As noted, the data exchange schemas may be determined, created, and/or developed for the user with and/or without the user's inputs. For example, the data exchange system may create a given data exchange schema based on recognizing data transfers previously authorized by the user. In one scenario, the system may identify that the user gets a cup of coffee at a given coffee shop regularly, such as on Monday mornings. As such, the system may give the coffee shop a limited access to the user's account data when the user goes to the coffee shop to get a cup of coffee. Thus, the user may be able to get a cup of coffee without a credit card, for example. Yet, the system may also send a notification to the user's smartphone requiring an input from the user to authorize the coffee shop to have the limited access to the user's account to deduct a given amount from the user's balance to pay for the coffee. As such, the system may build data exchange schemas for the user based on recognizing previous data transfers of the user. Further, the system may also build or modify the data exchange schemas based on inputs received from the user via the smartphone.

In some embodiments, the data exchange system may also record, track, and/or maintain records of the data provided to various entities. Particularly, in view of the various difficulties users face with tracking which entities have their data as described above, the data exchange system may resolve such challenges. For example, the system may record each instance where data is provided to a given entity, among numerous entities that may receive the data. By tracking and/or maintaining such records, the user may view the various entities that may be in possession of their data. For example, the user may view such records on their smartphone to determine which entities have access or possession of their name, birthdate, and/or address, among other forms of data associated with the user.

In some embodiments, the access that an entity has to the user's data may be controlled by the data exchange system and/or based on one or more user inputs. In addition to implementing limited accesses as described above, the system may create access rules that define the access that an entity has to the user's data. For example, an access rule may involve the entity having access to the user's data for specific purposes, such as the user's medical purposes or possibly for the mere purpose of getting a cup of coffee, as described above. Further, an access rule may involve the entity being restricted from transferring the user's data to other entities. In particular, an access rule may prevent the entity from saving the user's data to a remote server or computer. For example, the access rule may be implemented with a number of cryptographic protocols that may be used to encrypt the user's data, possibly based on an entity attempting to save the user's data on a remote computer. As such, the user, possibly in possession of the encryption key, may be able to control when the data is unencrypted such that a particular entity may be able to view the data. Even further, the data may be automatically encrypted once the entity has viewed the data, possibly after one or more periods of time.

In some embodiments, the data exchange system may provide suggestions to the user. For example, the system may inform the user that a particular entity has the user's address and phone number. Further, the system may inform the user that the entity may have an incentive to provide the user's address and phone number to other entities, possibly entities that may not be authorized by the user to have the user's address and phone number. As such, the system may provide a suggestion to the user to create a rule with the particular entity's access to the user's address and/or phone number. For example, the system may provide a suggestion to limit and/or remove the entity's access to the user's address and phone number. In particular, based on one or more user inputs received by the user's smartphone, the system may limit the access of the entity to prevent the particular entity from transferring the user's data to other entities, possibly utilizing one or more encryption protocols described above.

It should be noted that the data exchange system may also dynamically change the data exchange schemas based on a number of factors. For example, the system may change data in a particular schema that indicates the user's address, possibly to refresh the entities that may have access to the user's address. In practice, for instance, the system may recognize that the user has moved to a new address, possibly based on one or more user inputs or data transferred to a mail carrier website, a postal service website, and/or a digital address form, among other possibilities. As such, the system may dynamically change the user's address in an appropriate data exchange schema accordingly. As such, the user's new address may be transmitted, pushed out, and/or distributed to select entities (e.g., a credit card entity, a telecommunications entity, a cable network entity, etc.) to inform such entities of the user's new address. Notably, various inconveniences involved with the user manually updating the user's address with each of such entities may be eliminated accordingly.

Thus, the example embodiments described herein may resolve various challenges with managing data with mobile devices over communication networks in variable data infrastructures. As such, the example embodiments described herein may resolve problems that did not exist before the availability of the computer networks and/or the Internet. In particular, such embodiments may address problems specific to data exchanges with the use of computer networks in such data infrastructures and/or the Internet. Various such embodiments may provide solutions that are technical nature and/or rooted in data management systems associated with mobile devices and aspects of the data infrastructure. Further, such embodiments may provide unconventional steps confined to one or more particular useful applications related to maintaining data for a given user, possibly to manage personal data for the user.

FIG. 1A is a block diagram of an exemplary system 100, according to an embodiment. The system 100, possibly referred to as the data infrastructure 100, may be configured to transfer data over one or more communication networks 108. In particular, the system 100 may include the server 102, possibly referred to as the server system 102. The server 102 may be configured to perform operations of a service provider, such as PayPal, Inc. of San Jose, Calif., USA. Further, the system 100 may also include client device 104 and/or the client device 106 operated by their respective users. In practice, the server 102 and the client devices 104 and/or 106 may be configured to communicate over the one or more communication networks 108.

The system 100 may operate with more or less than the computing devices shown in FIG. 1A, where each device may be configured to communicate over one or more communication networks 108, possibly to transfer data accordingly. The one or more communication networks 108 may also include a packet-switched network configured to provide digital networking communications, possibly to exchange data of various forms, content, type, and/or structure. The one or more communication networks 108 may include a data network such as a private network, a local area network, and/or a wide area network. In some instances, the one or more communication networks 108 may include a communications network such as a telecommunications network and/or a cellular network with one or more base stations, among other possible networks.

The data/data packets 122 and/or 124 may be transferrable using communication protocols such as packet layer protocols, packet ensemble protocols, and/or network layer protocols. For example, the data/data packets 122 and/or 124 may be transferrable using transmission control protocols and/or internet protocols (TCP/IP). In various embodiments, each of the data/data packets 122 and 124 may be assembled or disassembled into larger or smaller packets of varying sizes, such as sizes from 1,000 to 1,500 bytes, for example, among other possible sizes. As such, data/data packets 122 and/or 124 may be transferrable over the one or more networks 108 and to various locations in the data infrastructure 100.

In some embodiments, the server 102 may take a variety of forms. The server 102 may be an enterprise server, possibly configured with one or more operating systems to facilitate the scalability of the data infrastructure 100. For example, the server 102 may configured with a Unix-based operating system to integrate with a growing number of other servers, client devices 104 and/or 106, and one or more networks 108 over the system architecture 100. The server 102 may further facilitate workloads associated with numerous data transfers in view of an increasing number of data exchange schemas implemented for users.

In some embodiments, the server 102 may include multiple components, such as a hardware processor 112, a non-transitory memory 114, a non-transitory data storage 116, and/or a communication interface 118, among other possible components, any of which may be communicatively linked via a system bus, network, or other connection mechanism 120. The hardware processor 112 may take the form of a multi-purpose processor, a microprocessor, a special purpose processor, a digital signal processor (DSP) and/or other types of processing components. For example, the processor 112 may include an application specific integrated circuit (ASIC), a programmable system-on-chip (SOC), and/or a field-programmable gate array (FPGA) to process, read, and/or write data for an increasing number of data exchange schemas for numerous users. In particular, the processor 112 may include a variable-bit (e.g., 64-bit) processor architecture specifically configured to facilitate the scalability of the increasing number of data exchange schemas. As such, the one or more processors 112 may execute varying instructions sets (e.g., simplified and complex instructions sets) with fewer cycles per instruction than other conventional general-purpose processors to improve the performance of the server 102 for purposes of scalability and/or the accommodation of growth.

In practice, for example, the hardware processor 112 may be configured to parse the one or more data packets 122 to identify one or more types of data (e.g., data entries) transferred with the client device 104. The processor 112 may also create one or more data exchange schemas for a user of the client device 104 based on the one or more types of data transferred. As such, possibly based on a location of the client device 104 associated with an entity, e.g., the doctor's office or a coffee shop, the processor 112 may identify a particular data exchange schema that corresponds to the entity. For example, the processor 112 may determine an access of the entity to a portion of the data from the particular data exchange schema. The processor 112 may also initiate the transmittal of a notification to the client device 104 of the user that indicates the access the entity to the portion of data.

The non-transitory memory component 114 and/or the non-transitory data storage 116 may include one or more volatile, non-volatile, and/or replaceable data storage components, such as a magnetic, optical, and/or flash storage that may be integrated in whole or in part with the hardware processor or component 112. Further, the memory component 114 may include a number of instructions and/or instruction sets. The processing component 112 may be coupled to the memory component 114 and configured to read the instructions to cause the server 102 to perform operations, such as those described in this disclosure, illustrated by the accompanying figures, and/or otherwise contemplated herein.

The communication interface or component 118 may take a variety of font's and may be configured to allow the server 102 to communicate with one or more devices, such as the client devices 104 and/or 106. For example, the communication interface 118 may include a transceiver that enables the server 102 to communicate with the client devices 104 and/or 106 via the one or more communication networks 108. Further, the communication interface 118 may include a wired interface, such as an Ethernet interface, to communicate with the client devices 104 and/or 106. Yet further, the communication interface 118 may include a wireless interface, such as a cellular interface, a Global System for Mobile Communications (GSM) interface, a Code Division Multiple Access (CDMA) interface, and/or a Time Division Multiple Access (TDMA) interface, among other possibilities. In addition, the communication interface 118 may include a wireless local area network interface such as a WI-FI interface configured to communicate with a number of different protocols. As such, the communication interface 118 may include a wireless interface configured to transfer data over short distances utilizing short-wavelength radio waves in approximately the 2.4 to 2.485 GHz range. In some instances, the communication interface 118 may send/receive data or data packets 122 and/or 124 to/from client devices 104 and/or 106.

The client devices 104 and 106 may also be configured to perform a variety of operations such as those described in this disclosure, illustrated by the accompanying figures, and/or otherwise contemplated herein. For example, the client devices 104 and 106 may be configured to transfer data packets 122 and/or 124 with the server 102, such that the server 102 may manage one or more data exchange schemas for respective users of the client device 104 and/or 106. The server 102 may manage the data exchange schemas based on various types of data transferred with the data packets 122 and/or 124. For example, the server 102 may determine data exchange schemas based on the data/data packets 122 and/or 124 including location data, such as Global Positioning System (GPS) data or GPS coordinate data, triangulation data, beacon data, WI-FI data, peer data, social media data, sensor data, movement data, temperature data, and/or other types of data described or contemplated herein.

In some embodiments, the client devices 104 and 106 may include or take the form of a smartphone system, a personal computer (PC) such as a laptop device, a tablet computer device, a wearable computer device, a head-mountable display (HMD) device, a smart watch device, and/or other types of computing devices configured to transfer data. The client devices 104 and 106 may include various components, including, for example, input/output (I/O) interfaces 130 and 140, communication interfaces 132 and 142, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to respective users of the client devices 104 and 106. For example, the I/O interface 130 may include a display that provides a graphical user interface (GUI) configured to receive an input from a user to create, configure, and/or modify one or more data exchange schemas. Thus, the I/O interfaces 130 and 140 may include displays configured to receive inputs and/or other input hardware with tangible surfaces, such as touchscreens with touch sensitive sensors and/or proximity sensors. The I/O interfaces 130 and 140 may also include a microphone configured to receive voice commands, a computer mouse, a keyboard, and/or other hardware to facilitate input mechanisms. In addition, I/O interfaces 130 and 140 may include output hardware such as one or more sound speakers, other audio output mechanisms, haptic feedback systems, and/or other hardware components.

In some embodiments, communication interfaces 132 and 142 may include or take a variety of forms. For example, communication interfaces 132 and 142 may be configured to allow client devices 104 and 106, respectively, to communicate with one or more devices according to a number of protocols described and/or contemplated herein. For instance, communication interfaces 132 and 142 may be configured to allow client devices 104 and 106, respectively, to communicate with the server 102 via the one or more communication networks 108. The hardware processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components.

The non-transitory data storages 136 and 146 may include one or more volatile or non-volatile data storages, removable or non-removable data storages, and/or a combination of such data storages that may be integrated in whole or in part with the hardware processors 134 and 144, respectively. Further, data storages 136 and 146 may include non-transitory memories that store instructions and/or instructions sets. Yet further, the processors 134 and 144 may be coupled to the data storages 136 and 146, respectively, and configured to read the instructions from the non-transitory memories to cause the client devices 104 and 106 to perform operations, respectively, such as those described in this disclosure, illustrated by the accompanying figures, and/or otherwise contemplated herein.

Figure 1B:
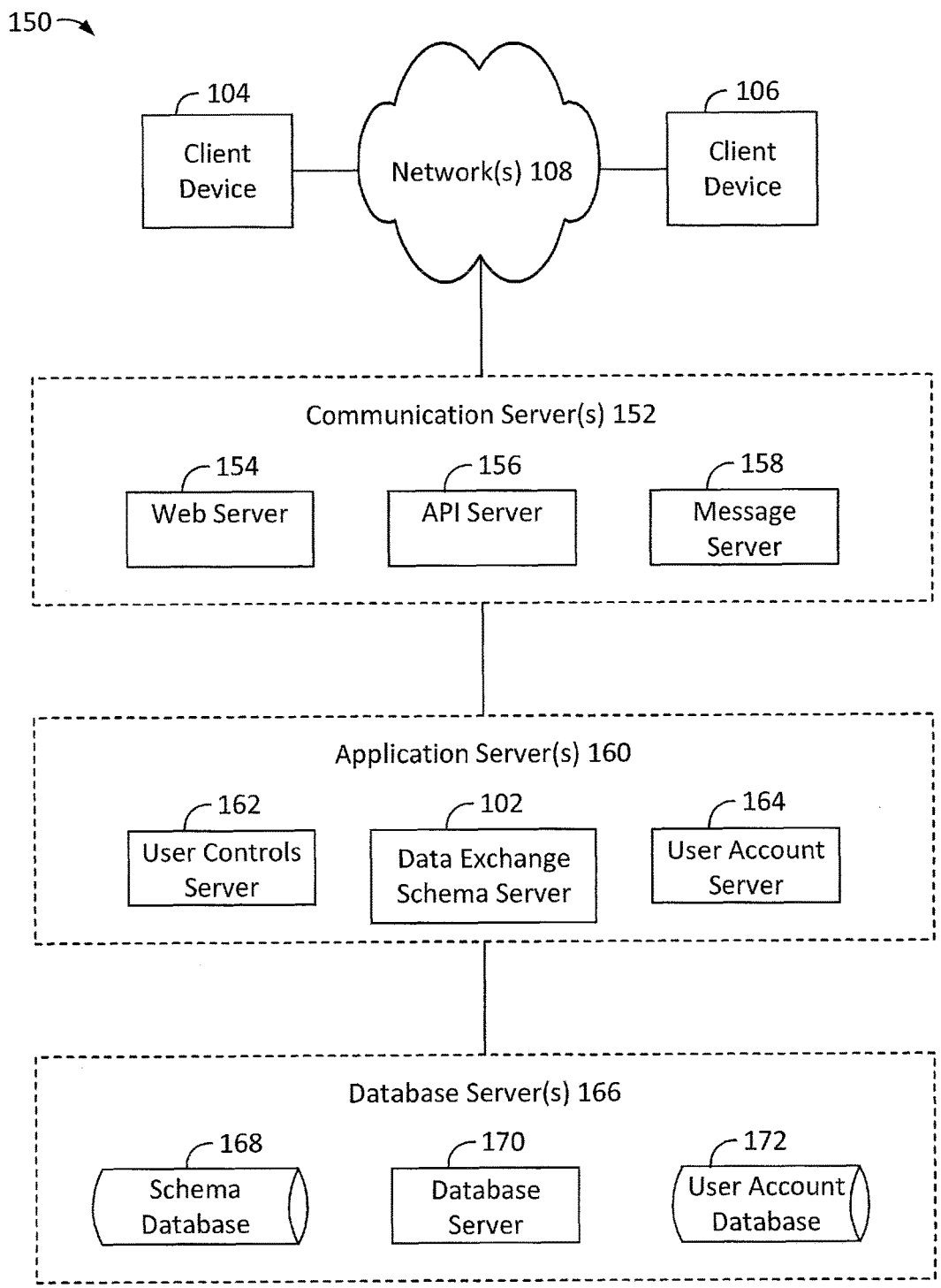
FIG. 1B is a block diagram of another exemplary system, according to an embodiment.

FIG. 1B is a block diagram of another exemplary system, according to an embodiment. As shown, the system 150 may be configured to transfer data, such as data and/or data packets 122 and/or 124, as described above in relation to system 100 in FIG. 1A. For example, the system 150 includes the server 102, shown as a data exchange schema server 102. Further, the system 150 includes the client devices 104 and 106, and also the one or more networks 108. As illustrated, the data infrastructure 150 may include one or more communication servers 152, one or more application servers 160, and/or one or more database servers 166.

In some embodiments, the one or more communication servers 152 may include a web server 154, an application programming interface (API) server 156, and/or a message server 158. The web server 154 may be configured to communicate with the client devices 104 and/or 106 over the one or more networks 108. The web server 154 may host numerous web browsers, web sites, web-based applications, software applications, virtual machines, and/or other possibilities. The API server 156 may be configured to communicate with various applications of the client devices 104 and/or 106, including service provider applications configured to communicate with API-based communications and/or protocols over the one or more networks 108. The message server 158 may be configured to communicate with the client devices 104 and/or 106 over the one or more networks 108 with various transmissions, communication mediums, and/or related applications such as e-mail, local area network (LAN) messaging, and/or short message service (SMS), among various other possibilities. Notably, any two or more of the servers 154, 156, and/or 158 may be combined and the combined server may be configured to perform a one or more operations of the servers 154, 156, and/or 158 as described and/or contemplated herein.

In some embodiments, the one or more application servers 160 may include the data exchange schema server 102, the user controls server 162, and/or the user account server 164. The data exchange schema server 102 may maintain, manage, and/or support numerous data exchange schemas for one or more users as described herein. The user controls server 162 may maintain, manage, and/or support various user controls, configurations, and/or settings associated with the data exchange schemas for the one or more users. The user account server 164 may maintain, manage, and/or support numerous user accounts for the one or more users, such as email accounts, networking accounts, and/or payment provider accounts, among other types of accounts described and/or contemplated herein.

In some embodiments, the one or more database servers 166 may include the database server 170, the data exchange schema database 168, and/or the user account database 172. The database server 170 may communicate with the data exchange schema server 102 to facilitate the storage of data, data types, and/or data entries of the data exchange schemas in the data exchange schema database 168. The database server 170 may also communicate with the user account server 164 to facilitate the storage of user account data in the user account database 172. In some embodiments, the data stored with the schema database 168 may correspond to the data stored with the user account database 172. As such, the database server 170 may include one or more search indexes with varying complexities to minimize replicated data entries stored in the schema database 168 and the account database 172.

In practice, for example, a user operating the client device 104 may send a request over the one or more networks 108 to create one or more data exchange schemas. Referring back to FIG. 1A, for example, the request may be embedded with the data/data packet 122. As such, the request may be transmitted to the one or more communications servers 152 to request a connection with the data exchange schema server 102. For example, the web server 154, possibly referred to as a domain name server (DNS) in this scenario, may search and identify one or more internet protocol (IP) addresses of the data exchange schema server 102, possibly taking the form of 192.168.102. As such, a connection with the client device 104 and the data exchange schema server 102 may be established to create the one or more data exchange schemas. Notably, the client device 104 may establish such connections with the schema server 102 with or without user inputs, possibly to generate, build, and/or modify the data exchange schemas in real-time, possibly unbeknownst to the user of the client device 104.

In some embodiments, the system 150 may be referred to as a data exchange system 150. In particular, the data exchange system 150 may include the non-transitory memory 114 for storing instructions. The data exchange system 150 may also include the one or more of hardware processors 112 coupled to the non-transitory memory 114 and configured to read the instructions to cause the system 150 to perform operations. The system 150 may create one or more data exchange schemas for a user with or without the user's inputs, where each data exchange schema compiles one or more types of data associated with the user. The system 150 may determine a location of the client device 104, possibly based on the connection between the client device 104 and the data exchange schema server 102 described above.

In some instances, the location, such as the doctor's office described above, may be associated with one or more entities (e.g., the doctor's staff, medical insurance companies, and/or drug stores in the above scenarios). In response to determining the location of the client device, the system 150 may determine a given data exchange schema from the one or more data exchange schemas based on the one or more entities. For example, the data exchange schema identified may be configured for the scenario where the user visits the doctor's office. The system 150 may determine an access of the one or more entities to a portion of data from at least one data exchange schema. For example, the system 150 may provide the doctor's office with limited access to the user's medical history such that the information cannot be transferred to other entities without the user's permission. The system 150 may transmit a notification to the client device that indicates the access of the one or more entities to the portion of data.

It can be appreciated that the data exchange schema server 102 and the client devices 104 and/or 106 may be deployed in various other ways. For example, the operations performed by the server 102 and/or the client devices 104 and 106 may be performed by a greater or a fewer number of devices. Further, the operations performed by two or more devices, such as the servers 102, 162, and/or 164, may be combined and performed by a single device, such as the server 102. Yet further, the operations performed by a single device, such as the server 102, may be separated or distributed among the server 102, the client devices 104 and/or 106, the user controls server 162, and/or the user account server 164, among other possible devices. In addition, the client devices 104 and/or 106 may be operated and/or maintained by different users such that each client device 104 and/or 106 may be associated with one or more accounts.

Notably, one or more user accounts maintained by the user account server 164 may be displayed on the client device 104, possibly through the I/O interface 130 described above. As such, a user account may be displayed on a smartphone system to provide the user with access to the account. In some instances, the user may access the one or more accounts to view the number of data exchange schemas shared with one or more entities. Yet further, the user may access the data exchange schemas to view the one or more accounts.

In some embodiments, an account, possibly referred to a user account, may take a number of different forms. For example, an account may be an e-mail account, a networking account, a professional and/or a social networking account, a smartphone account, a music or music playlist accounts, and/or a video streaming account, among other possible accounts. Further, an account may include a compilation of data associated with a given user. For example, an account for a particular user may include data related to the user and/or the user's interests. Some examples of accounts may include accounts with service providers described above, e-commerce accounts, and/or accounts with funds, balances, fund transfers, transactions, and/or check-outs, among other possibilities.

In some embodiments, a user may have a single user account with a given service provider that may represent the user for multiple other service providers, applications, and/or services, among other possibilities. For example, the single user account may represent the user for e-mail accounts, networking or social networking accounts, smartphone accounts, as well as websites, applications, and/or other services. As such, a user could opt to use the single user account as a multi-purpose account for performing various operations, including managing one or more data exchange schemas for the user.

In some embodiments, a user account may be created for one or more users. For example, an account may be a family account created for multiple family members, where each member may have access to the account. In some instances, the account may be a corporate account, where employees, staff, worker personnel, and/or contractors, among other individuals may have access to the corporate account. Yet further, it should be noted that a user, as described herein, may be a number of individuals or possibly a robot, a robotic system, a computing device, a computing system, and/or another thin' of technology capable of transferring data corresponding to the account. The user may be required to provide a login, a password, a code, an encryption key, authentication data, and/or other types of data to access the account.

Figure 2A:
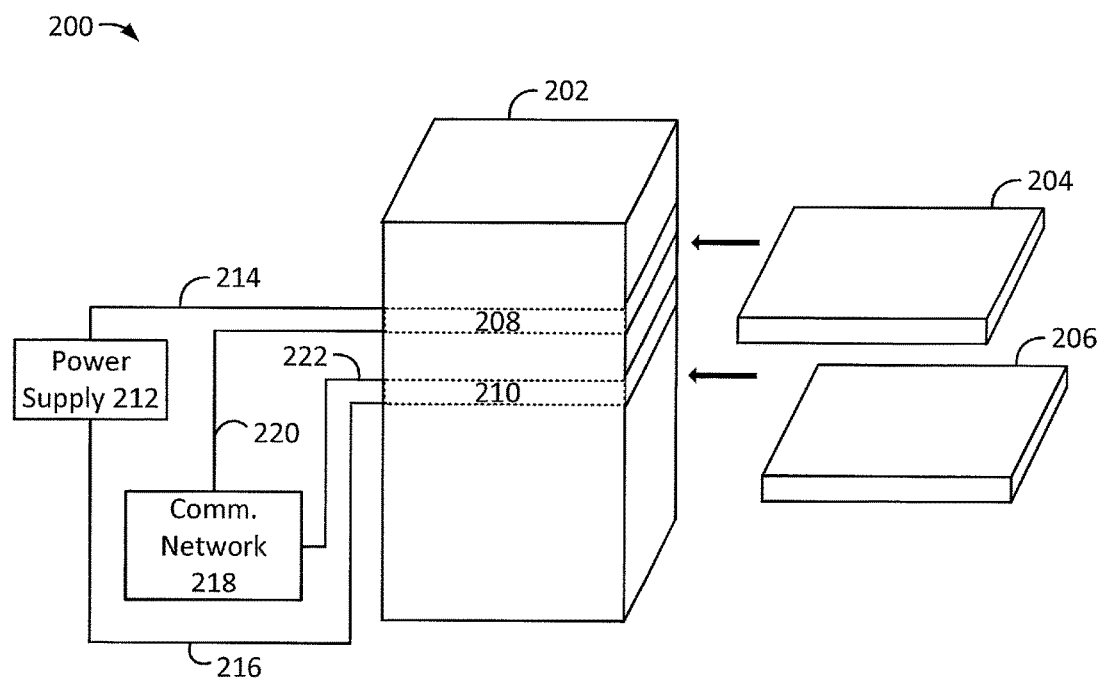
FIG. 2A illustrates an exemplary system configured to support a set of trays, according to an embodiment.

FIG. 2A illustrates exemplary system 200 configured to support a set of trays 204 and 206, according to an embodiment. The system 200 may, for example, include or take the form of the server 102 described above in relation to FIGS. 1A and 1B. In particular, the system 200 may also be referred to as the server 200 and/or the server system 200. As such, the system 200 may manage numerous data exchange schemas for the users of client devices, such as the client devices 104 and/or 106. The system 200 may further support, operate, run, and/or manage the data exchange schemas, possibly in addition to various applications, websites, and/or services.

As shown, the system 200 may include a chassis 202 that may support trays 204 and 206, possibly also referred to as servers or server trays 204 and/or 206. Notably, the chassis 202 may support multiple other servers and/or trays as well. The chassis 202 may include slots 208 and 210, among other possible slots, configured to hold or support trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204.

Further, the chassis 202 may be connected to a power supply 212 via connections 214 and 216 to provide power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into the slots 210 and 208, respectively, and power supply 212 may supply power to trays 204 and 206 via connections 216 and 214, respectively.

Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively. The communication network 218 may, for example, take the form of the one or more communication networks 108, possibly including one or more of a data network and a cellular network. In some embodiments, the communication network 218 may provide a network port, a hub, a switch, or a router that may be connected to an Ethernet link, an optical communication link, a telephone link, among other possibilities.

In practice, the tray 204 may be inserted into the slot 208 and the tray 206 may be inserted into the slot 210. During operation, the trays 204 and 206 may be removed from the slots 208 and 210, respectively. Further, the tray 204 may be inserted into the slot 210 and the tray 206 may be inserted into the slot 208, and the system 200 may continue operating, possibly based on various data buffering mechanisms of the system 200. Thus, the capabilities of the trays 204 and 206 may facilitate uptime and the availability of the system 200 beyond that of traditional or conventional servers that may be required to run without interruptions. As such, the server trays 204 and/or 206 facilitate fault-tolerant capabilities of the server system 200 to further extend times of operation. In some instances, the server trays 204 and/or 206 may include specialized hardware, such as hot-swappable hard drives, that may be replaced in the server trays 204 and/or 206 during operation. As such, the server trays 204 and/or 206 may prevent interruptions to further increase uptime.

Figure 2B:
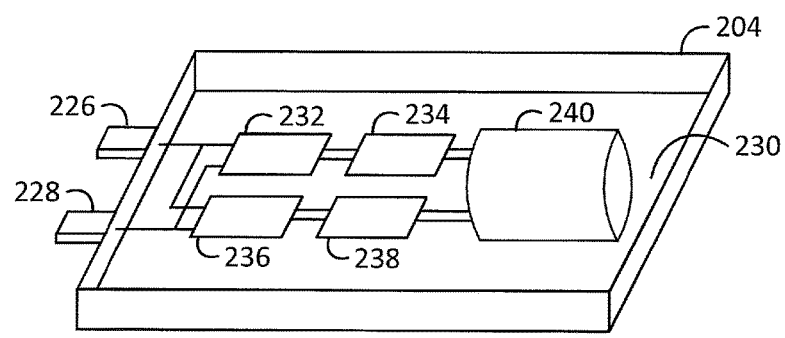
FIG. 2B illustrates an exemplary tray configured to support one or more components, according to an embodiment.

FIG. 2B illustrates an exemplary tray 204 configured to support one or more components, according to an embodiment. The tray 204, possibly also referred to as the server tray 204, may take the form of the tray 204 described in relation to FIG. 2A. Further, the tray 206 may also take the form of the tray 204. As shown, the tray 204 may include a tray base 230 that may include the bottom surface of the tray 204. The tray base 230 may be configured to support multiple components such as the hard drives described above and a main computing board connecting one or more components 232-240. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

In some embodiments, the tray 204 may include a hardware processor component 232, a non-transitory memory component 234, a non-transitory data storage component 236, a communication interface component 238, that may, for example, take the form of the processor 112, the memory 114, the data storage 116, and the communication interface 118, respectively. Further, the tray 204 may include the data engine component 240 that may manage data exchange schemas for numerous users. As such, the connections 226 and 228 may be configured to provide power and network connectivity, respectively, to each of the components 232-240. In some embodiments, one or more of the components 232-240 may perform operations described herein, illustrated by the accompanying figures, and/or otherwise contemplated.

As shown, the hardware processor component 232 may take the form of a multi-purpose processor, a microprocessor, a special purpose processor, a digital signal processor (DSP). Yet further, the processor component 232 may take the form of an application specific integrated circuit (ASIC), a programmable system on chip (PSOC), field-programmable gate array (FPGA), and/or other types of processing components. In particular, the processor component 232 may create, modify, and/or build data exchange schemas for numerous users. For example, the processor component 232 may be configured with a Unix-based operating system. Further, the processor component 232 may support the scalability of numerous data exchange schemas developed with various other servers, such as those described above in relation to the data infrastructure 150. In particular, the processor component 232 may be configured to facilitate the scalability with multiple such servers of various forms that may, for example, include server trays, blades, and/or cartridges similar to the server trays 204 and/or 206. In some instances, the processor component 232 may be configured with scalable process architectures, including, reduced instruction set architectures. In some instances, the processor component 232 may be backwards compatible with various legacy systems such that the processor component 232 may receive, read, and/or execute instruction sets with legacy data formats and/or structures. As such, the processor component 232 generally has capabilities beyond that of general-purpose processors.

The database engine component 240 may include one or more secure databases to support, manage, and/or maintain data exchange schemas for numerous users. In particular, the data base engine component 240 may organize and/or format the data exchange schemas for optimizing searches and/or retrieving data. In various circumstances, the database engine component 240 may perform searches based on numerous queries, search multiple databases in parallel, and produce search results simultaneously and/or consecutively. Thus, the database engine component 240 may relieve various bottlenecks encountered with conventional servers managing numerous accounts.

Any two or more of the components 232-240 described above may be combined. For example, two or more of the hardware processor component 232, the non-transitory memory component 234, the non-transitory data storage component 236, the communication component and/or interface 238, and/or the data engine component 240 may be combined. Further, the combined component may take the form of one or more processors, DSPs, SOCs, FPGAs, and/or ASICs, among other types of processing devices and/or components described herein. For example, the combined component may take the foal' an SOC that integrates various other components in a single chip with digital, analog, and/or mixed-signal functions, all incorporated within the same substrate. As such, the SOC may be configured to carry out various operations of the components 232-240.

The components 232-240 described above may provide advantages over conventional or general-purpose components. For example, the components 232-240 may enable the system 200 to transfer data over the one or more networks 218 to numerous other client devices, such as the client devices 104 and/or 106. In particular, the components 232-240 may enable the system 200 to build data exchange schemas for numerous users locally from a single server tray 204. In some instances, configuring a separate and/or dedicated hardware processor component 232 to manage the data exchange schemas may optimize operations beyond the capabilities of conventional servers and/or general-purpose processors. As such, the average wait time for the client device 104 to display data from the data exchange schemas may be minimized accordingly.

It can be appreciated that the system 200, the chassis 202, the trays 204 and 206, the slots 208 and 210, the power supply 212, the communication network 218, and the components 232-240 may be deployed in other ways. The operations performed by components 232-240 may be combined or separated for a given embodiment and may be performed by a greater number or fewer number of components or devices. Further, one or more components or devices may be operated and/or maintained by the same or different entities.

Figure 3A:
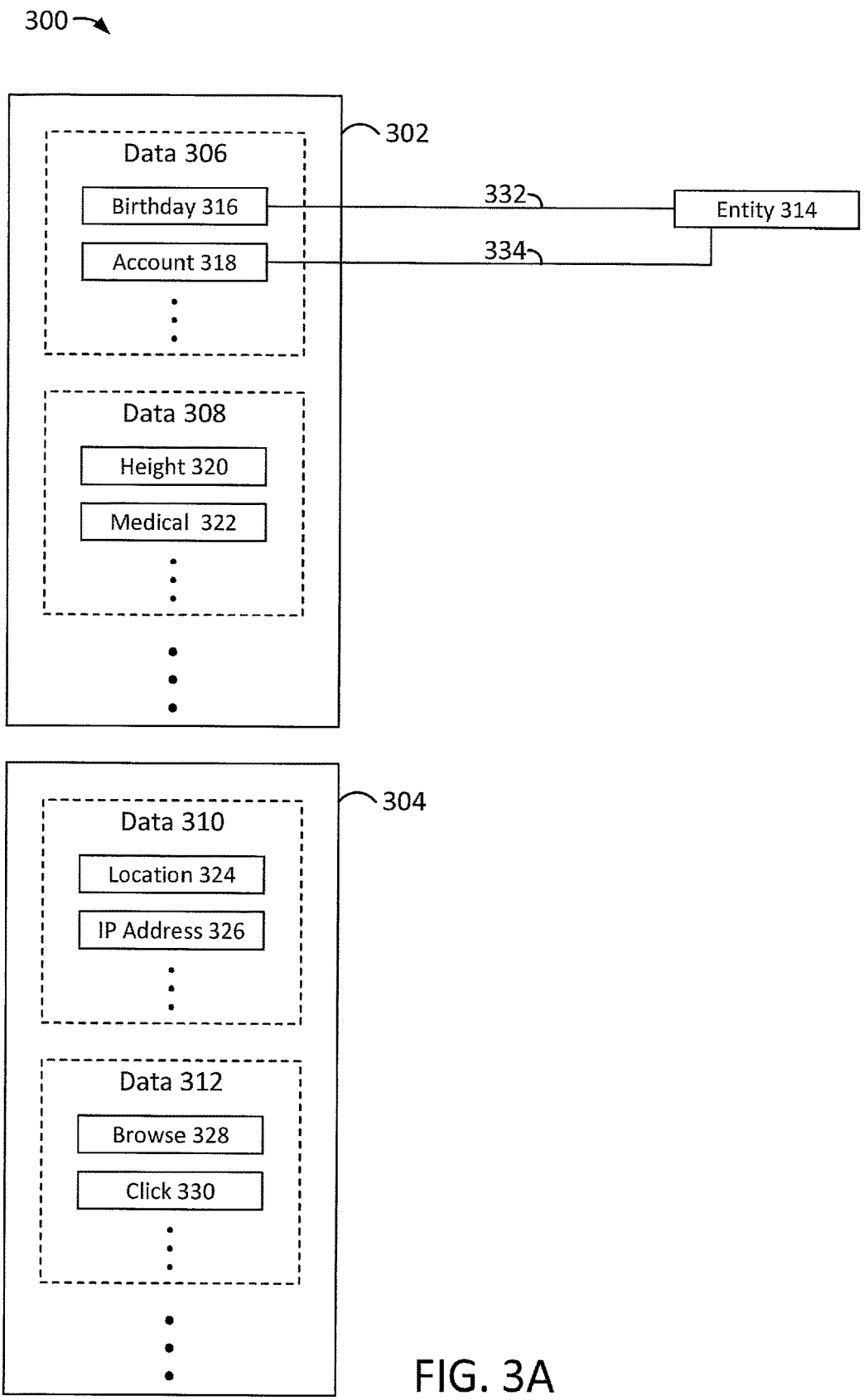
FIG. 3A illustrates a data exchange system, according to an embodiment.

FIG. 3A illustrates a data exchange system 300, according to an embodiment. As shown, the system 300 manages, maintains, and/or supports one or more data exchange schemas 302 and/or 304, among other possible data exchange schemas contemplated. In particular, the system 300 may manage one or more databases 306 and/or 308 in the data exchange schema 302, among other possible databases as shown with the ellipses below the database 308. Further, the system 300 may manage one or more databases 310 and/or 312 in the data exchange schema 304, among other possible databases as shown with the ellipses below the database 312. Notably, the data exchange system 300 may include one or more of the systems described above (e.g., 100, 150, and/or 200) to manage, maintain, and/or support the one or more data exchange schemas 302 and/or 304.

As shown, the database 306 of the data exchange schema 302 may include one or more types of data. For example, the database 306 may include birthday data 316. Notably, various aspects of the birthday data 316 may be derived, possibly based on one or more data exchange schemas, such as the data exchange schemas 302 and/or 304. For instance, the day, month, and/or year of the user's birthday, the age of the user, and/or the birth place of the user may be derived from the data exchange schemas 302 and/or 304. Further, the birthplace of the user may be derived based on aggregating other forms data from the data exchange schemas 302 and/or 304 to identify a city, state, and/or the country of the user's birthplace.

Further, the database 306 may be used to derive and/or aggregate various other types of data that may identify the user. For example, the database 306 may include the user's name (e.g., first, middle, and last), the gender of the user, social security number, and/or driver's license number, among other types of data that may identify the user. Yet further, the database 306 may also be used to derive the user's email address, home address, shipping address, billing address, work address, and/or telephone number, among other types of data that may be used to contact the user. Notably, the user's address in the database 306 may be derived from one or more other data exchange schemas, such as the data exchange schemas 302 and/or 304. For example, the city, state, country, and/or region of the country associated with the user's address may be derived from aggregating other forms of data from the data exchange schemas 302 and/or 304, as described herein.

Further, the database 306 of the data exchange schema 302 may include account data 318. The account data 318 may include various types of data related to a user's account, such as an account with a service provider, among other types of accounts described above (e.g., e-mail accounts, communications accounts, and/or networking accounts). In some instances, the account data 318 may indicate a balance, bank account data, a credit card number, a debit card number, and/or a transaction history, among other types of data associated with transferring fund amounts from the user's account. Yet, the database 306 may be used to derive various other types of data as shown with the ellipses below the account data 318.

Yet further, the database 308 of the data exchange schema 302 may include one or more other types of data. For example, the database 308 may include a height 320 of the user, possibly indicating the height of the user over a number of years. For example, a number of changes to the height of the user over the years may be derived from the database 308. Further, the database 308 may be used to derive various other types of data related to the user's traits, features, and/or characteristics. For example, the database 308 may be used to derive the user's waist measurements, pant length, shoe size, weight, head size, hair color, body type, and/or facial structure, among other types of data related to the user's physical attributes.

In addition, the database 308 of the data exchange schema 302 may include medical data 322. The medical data 322 may include various types of data related to the user's medical history as described above. For example, the medical data 322 may be used to derive the user's allergies, vitals measurements, blood pressure, blood type, medical insurance information, medical history, medications or immunizations taken, prescriptions provided to the user, among other types of data related to the user's medical history.

Referring to the data exchange schema 304, the database 310 may include one or more types of data, possibly related to the user's location. For example, referring back to FIGS. 1A and 1B, various forms of location data may be retrieved based on the connection established with the client device 104 and/or the data exchange schema server 102. For example, based on one or more data exchanges for establishing the connection, the data exchange schema server 102 may retrieve Wi-Fi beaconing data, Enhanced Observed Time Difference (EOTD) data, global positioning System (GPS) data, Assisted GPS (A-GPS) data, Differential GPS (DGPS) data, Time Difference of Arrival (TDOA) data, Angle of Arrival (AOA) data, triangulation data, local transceiver pilot signal data, among other forms of location data described above.

Further, the database 310 of the data exchange schema 304 may include one or more types of data, possibly related to the user's device and/or devices. For example, the database 310 may include the IP address data 326, possibly indicating the IP address of the user's device, such as the client device 104 described above. For example, the IP address data 326 of the client device may be a numerical representation assigned to the client device based on a connection to the one or more networks, such as the one or more networks 108 described above. As such, the IP address of the client device may be shared with one or more entities to establish other connections and/or communications. Notably, the access to the IP address data 326 may be hidden and/or shared in a controlled manner with the given accesses provided to the data exchange schema 304.

Yet further, the database 312 of the data exchange schema 304 may include one or more types of data, possibly related to the user's interactions with the one or more devices. For example, the database 312 may include browse data 328 that indicates the sites, websites, applications, browsers, searches, search strings, and/or search histories of the user, among other possibilities related to the user browsing with one or more devices. Further, the database 312 may include click data 330 that indicates the user selections, possibly associated with the browsing described above. In particular, the click data 330 may indicate various links that the user selects and/or interacts with in some manner, among other possibilities that may indicate the user's interests.

Notably, the data exchange schemas 302 and/or 304 may include one or more types of data. Further, the schemas 302 and/or 304 may include different levels of specificity. For example, the schemas 302 and/or 304 may include broad types or levels such as music preference or genre. Further, the schemas 302 and/or 304 may also include types or levels with more specificity such as particular artists, albums, and/or songs. Each of these various types or levels of data may be accessible by one or more entities based on how the data may be used.

As shown, the data exchange system 300 may provide one or more accesses 332 and/or 334 to the one or more entities 314. For example, consider the scenario where the user visit's the doctor's office. Based on the user entering the doctor's office, the user's device and the doctor's office may communicate and exchange data, possibly based on a WIFI connections. The system 300 may identify the data exchange schema 302 associated with the user visiting the doctor's office. In particular, the system 300 may identify the data exchange schema 302 from a number of different schemas associated with the user, including the data exchange schema 304. As such, the system 300 may search and identify the birthday data 316 and/or the account data 318 related to the user visiting the doctor's office. In some instances, the system 300 may derive the user's birthday, the user's age, and/or the user's birthplace based on the various forms of data in the data exchange schemas 302 and/or 304, as described above. Further, the system 300 may provide such data to the user's device, possibly allowing the user to add further data to the birthday data 316 and/or the account data 318. For example, the use may add the user's symptoms in the previous hours or days, possibly being the basis for the user visiting the doctor's office. As such, the birthday data 316, the account data 318, and/or a description of the user's symptoms may be provided to doctor's staff, described in this scenario as the one or more entities 314.

In some embodiments, the data exchange system 300 includes a non-transitory memory storing instructions and one or more hardware processors. For example, referring back to FIGS. 1A-2B, the data exchange system 300 includes the non-transitory memory 114 and/or 234 that stores the instructions. The one or more one or more hardware processors 112 and/or 232 is coupled to the non-transitory memory 114 and/or 234 to read the instructions. As such, the data exchange system 300 performs operations. The operations include determining one or more data exchange schemas 302 and/or 304 for a user, where each data exchange schema 302 and/or 304 compiles one or more types of data associated with the user. The operations also include determining a location 324 of a client device of the user, such as the client device 104 described above, where the location 324 is associated with one or more entities 314. In response to determining the location 324 of the client device, the operations may include determining the data exchange schema 302 from the one or more data exchange schemas 302 and/or 304 based on the one or more entities 314. The operations may include determining accesses 332 and/or 334 of the one or more entities 314 to at least a portion of data 316 and/or 318 from the data exchange schema 302. The operations may include transmitting a notification to the client device, e.g., the client device 104, that indicates the accesses 332 and/or 334 of the one or more entities 314 to the portion of data 316 and/or 318, respectively, from the data exchange schema 302.

In some embodiments, the data exchange system 300 may provide the accesses 332 and/or 334 to the one or more entities 314 based on various times recognized. For example, the data exchange system 300 may retrieve the user's schedule from the client device 104 described above to be operated by the user. For example, referring back to FIG. 1B, the data exchange schema server 102 may request and receive the user's schedule based on the connection established with the client device 104 as described above. As such, the data exchange system 300 may perform operations that include determining one or more times associated with a user schedule accessible with the client device 104 of the user. As such, the accesses 332 and/or 334 of the one or more entities 314 to the portion of the data 316 and/or 318 may be determined based on the one or more times determined.

It should be noted that the one or more data exchange schemas 302 and/or 304 may also be determined by the data exchange system 300 based on inputs from the user. For example, referring back to FIG. 1A, the system 300 may recognize inputs received from a graphical user interface, e.g., the I/O interface 130, of the client device 104 that indicates the one or more types of data. As noted, the one or more types of data indicated may include the birthday data 316 and/or the account data 318. In particular, the system 300 may recognize such inputs based on data retrieved from the client device 104 during a connection protocol with the data exchange schema server 102. As such, the one or more data exchange schemas 302 and/or 304 may be determined from the one or more user inputs.

Figure 3B:
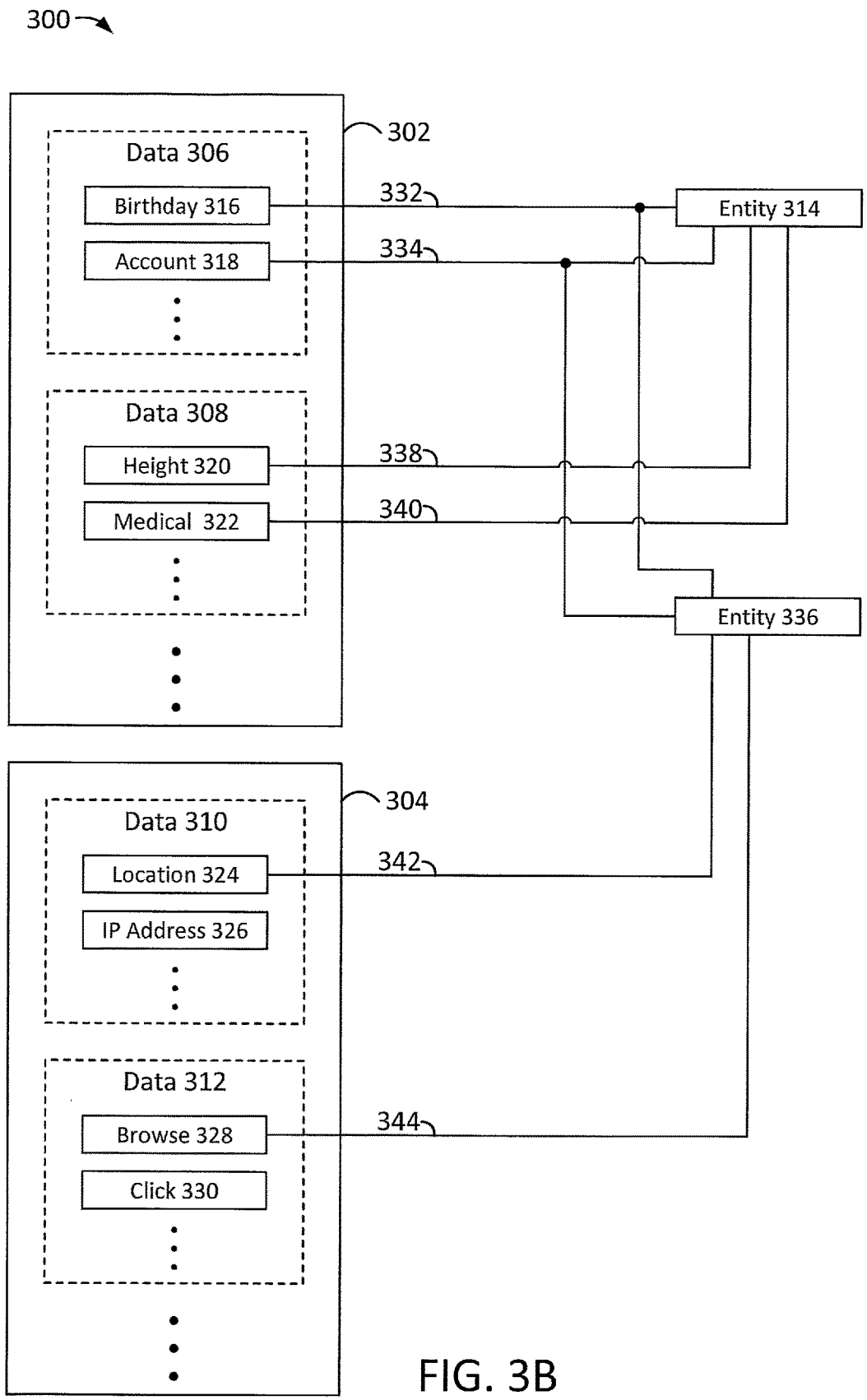
FIG. 3B illustrates a data exchange system with another entity, according to an embodiment.

FIG. 3B illustrates a data exchange system 300 with another entity, according to an embodiment. As shown, the data exchange system 300 includes the data exchange schemas 302 and/or 304 from FIG. 3A. As such, the data exchange schema 302 includes the database 306, further including the birthday data 316, the account data 318, and/or other types of data. As also shown, the one or more entities 314 have accesses 332 and/or 334 to the birthday data 316 and/or the account data 318, respectively. Yet further, the data exchange schema 302 includes the database 308, further including the height data 320, the medical data 322, and/or other types of data. In addition, the data exchange schema 304 includes the database 310, further including the location data 324, the IP address data 326, and/or other types of data. Further, the data exchange schema 304 includes the database 312, further including the browse data 328, the click data 330, and/or other types of data.

As also shown, the one or more entities 314 may have accesses 338 and/or 340 to the height data 320 and/or medical data 322, respectively. Considering the scenario regarding the doctor's office above, the system 300 may request the user's permission before providing the one or more entities 314 with the accesses 338 and/or 340 to the height data 320 and/or medical data 322, respectively. One possible difference in this particular scenario is that the one or more entities 314 may be given the accesses 332 and/or 334 without the system 300 requesting the user's permission. As noted, the accesses 332 and/or 334 may be provided to the doctor's office based on the location 324 of the client device of the user.

Yet further, also shown in FIG. 3B is the one or more entities 336. Consider, for example, that the one or more entities 336 includes a store that the user that the user visits often. In particular, the one or more entities 336 may represent a merchant of the store and/or a group of merchants associated with the store. As such, the system 300 may also determine the one or more data exchange schemas 302 and/or 304 based on the user's interactions with the one or more entities 336. As shown, for example, the one or more entities 336 may have accesses 332 and/or 334 to the user's birthday data 316 and/or the account data 318, respectively.

Yet, it should be noted that the accesses 332 and/or 334 for the one or more entities 336 may be the same or different than those for the one or more entities 314. For example, the one or more entities 314 may have the access 334 to the account data 318 for purposes of the doctor's office, possibly including charges associated with the doctor's office such as copays, prescription costs, and/or other related charges. Yet, the one or more entities 336 may have the access 334 to the account data 318 for the user's balance with the store, possibly for deducting from the balance when the user wishes to purchase items from the store. In some instances, the access 334 may be based on the specific purposes and/or uses by the entities 314 and/or 336, and may further be defined by a set of rights to the account data 318.

As such, the access 334 of the one or more entities 314 to the account data 318 may be limited in one or more different implementations. For example, the access 334 to the entities 314 and/or 336 may restrict the entities 314 and/or 336 from transferring the account data 318 to other entities. In some instances, the accesses 334 to the account data 318 may be controlled, from any such remote servers and/or computers. Further, the access 334 may prevent the entities 314 and/or 336 from saving and/or storing the account data 318 to unsecured servers and/or computers, possibly based on various data configurations of the account data 318. For example, the account data 318 may be protected with a number of cryptographic protocols and/or encryption layers that secure the account data 318 from unauthorized entities as described above. As such, the system 300 may control varying instances where the account data 318 is unencrypted such that the entities 314 and/or 336 may have the access 334 to the account data 318 for one or more defined purposes.

In addition, FIG. 3B shows the accesses 342 and/or 344 of the one or more entities 336 to the location data 324 and/or the browse data 328, respectively. For example, the user may have downloaded an application of the store, possibly referred to as a mobile app, that may be associated with the one or more entities 336. As such, the app may have location enabling services and user browse history and/or tracking services to have the accesses 342 and/or 344 to the location data 324 and/or the browse data 328, respectively. Notably, under some practices, the one or more entities 336 may have the accesses 342 and/or 344 to the location data 324 and/or the browse data 328, respectively, possibly unbeknownst to the user. Yet, as further described herein, the system 300 may enable the user to be aware of the accesses 342 and/or 344, among various other accesses, such as the accesses 332, 334, 338, and/or 340, and further control such accesses accordingly.

In some embodiments, the one or more data exchange schemas 302 and/or 304 may be determined based on a communication of the user's client device. For example, the system 300 may determine a data transfer from the client device with one or more types of data. As noted with the scenario above involving the mobile app, the system 300 may determine various data transfers associated with the app. Referring back to FIG. 1B, for example, the data exchange schema server 102 may communicate with the API server 156 to determine the data transfers associated with the app installed on the client device 104. As such, the system 300 may determine data transfers of one or more types of data based a communication of the client device with a remote device, such as the API server 156. In such instances, the one or more data exchange schemas 302 and/or 304 may be determined based on the data transfer of the one or more types of data.

Figure 3C:
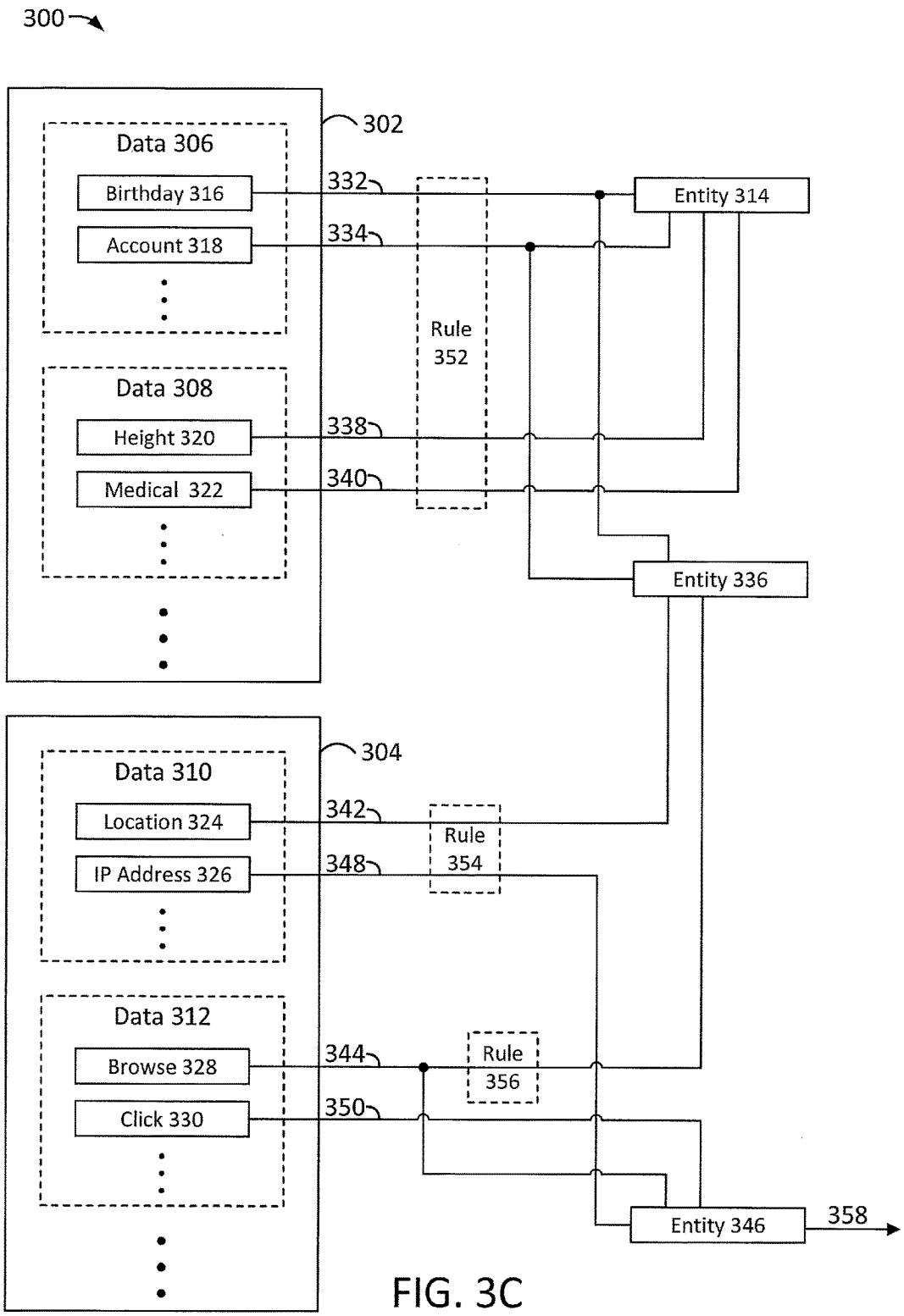
FIG. 3C illustrates a data exchange system with yet another entity, according to an embodiment.

FIG. 3C illustrates a data exchange system 300 with yet another entity, according to an embodiment. As shown, the data exchange system 300 includes the data exchange schemas 302 and/or 304 from FIGS. 3A and 3B. Further, the data exchange schema 302 includes the database 306, further including the birthday data 316, the account data 318, and/or other types of data. As also shown, the one or more entities 314 and/or 336 may have accesses 332 and/or 334 to the birthday data 316 and/or the account data 318, respectively. Yet further, the data exchange schema 302 includes the database 308, further including the height data 320, the medical data 322, and/or other types of data. As illustrated, the one or more entities 314 may have accesses 338 and/or 340 to the height data 320 and/or the medical data 322, respectively.

In addition, the data exchange schema 304 includes the database 310, further including the location data 324, the IP address data 326, and/or other types of data. Further, the data exchange schema 304 includes the database 312, further including the browse data 328, the click data 330, and/or other types of data. As shown, the one or more entities 336 may have accesses 342 and/or 344 to the location data 324 and/or the browse data 328, respectively, as described above.

Yet further, also shown in FIG. 3C is the one or more entities 346. Consider, for example, that the one or more entities 346 includes an online store, possibly an online store that the user has visited previously. For example, the one or more entities 346 may represent an online merchant and/or a group of online merchants. As such, the system 300 may also determine the one or more data exchange schemas 302 and/or 304 based on the user's interactions with the one or more entities 346, and/or various online websites of the one or more entities 346. As shown, for example, the one or more entities 346 may have accesses 344, 348, and/or 350 to the browse data 328, the IP address data 326, and/or the click data 330, respectively.

In addition, as also shown in FIG. 3C, a number of rules 352, 354, and/or 356 are provided. In some instances, the accesses 332, 334, 338, and/or 340 may be determined based on the rule 352. For example, the rule 352 may allow the one or more entities 314 to transfer the data 316, 318, 320, and/or 322 to other entities, possibly with permission(s) from the user. Yet, the rule 352 may not allow the one or more entities 336 to transfer data 316, 318, 320, and/or 322 to other entities, possibly with or without permissions from the user. Notably, the rules 352, 354, and/or 356 may be created by the system 300 and/or based on inputs from the user.

In some instances, the accesses 342 and/or 348 may be determined based on the rule 354. For example, the rule 354 may allow the one or more entities 336 to transfer the data 324 to other entities, possibly with permission from the user. Yet, the rule 354 may not allow the one or more entities 346 to transfer the IP address data 326 to other entities, possibly with or without permissions from the user. In some instances, the system 300 may identify an external access 358 from the entity 346, where other entities may retrieve the IP address data 326. As such, the rule 354 may not allow the one or more entities 346 to transfer the IP address data 326 to other entities.

As also shown, the access 344 may be determined based on the rule 356. Further, the access 350 may be determined without the rule 356. As such, the one or more entities 346 may have accesses 344 and/or 350 that are determined without any rules, possibly allowing the one or more entities 346 to transfer the data 328 and/or 330 based on the external access 358 to one or more other entities. Notably, the access 344 of the entity 346 to the browse data 328 may not be subject to the rule 356, whereas the access 344 of the entity 336 to the browse data 328 may be subject to the rule 356. As such, the access 344 for the one or more entities 336 may be different than the access 344 for the one or more entities 346. As noted, the one or more entities 346 may transfer the browse data 328 to one or more other entities based on the external access 358.

In some embodiments, the data exchange system 300 may perform further operations to control the accesses 332, 334, 338, 340, 342, 344, 348, and/or 350 based on user inputs and/or controls. For example, user controls may be received to determine the accesses 332, 334, 338, and/or 340 with the rule 352. Further, the user controls may be received to determine the accesses 342 and/or 348 with the rule 354. Yet further, the user controls may be received to determine the accesses 344 and/or 350 with the rule 356. As such, the operations of the data exchange system 300 may be performed where at least one of the data exchange schemas 302 and/or 304 is associated with one or more access rules 352, 354, and/or 356 determined by the user. As noted, for example, the access 334 of the one or more entities 314 and/or 336 to the portion of data 318 may be determined based at least on a particular access rule 352 from the one or more access rules 352, 354, and/or 356 determined. Notably, the user controls may be received to provide the accesses 332, 334, 338, 340, 342, 344, 348, and/or 350 for a given time duration and the accesses may then be removed after the termination of the time duration. Further, the accesses 332, 334, 338, 340, 342, 344, 348, and/or 350 may be recorded in a number of logs such that the user may view the accesses accordingly.

In some embodiments, the data exchange system 300 may perform further operations to inform the user whether one or more types of data 316-330 is shared with the one or more entities 314, 336 and/or 346, among other possible entities. For example, referring back to FIGS. 1A-3B, the system 300 may transmit notifications over the one or more networks 108 to the client device 104 of the user such that the user can view the notifications on the I/O interface 130, possibly including a graphical user interface with such notifications. In particular, the system 300 may perform operations including determining the one or more entities 346 permitted to share the portion of data 328 and/or 330 based on a particular access rule 356 associated with the portion of data 328 and/or 330. The system 300 may perform further operations including determining one or more second or other entities that may receive the portion of the data 328 and/or 330 from the one or more entities 346, possibly based on the access 358. The system 300 may transmit notifications to the client device to further indicate the one or more second or other entities that received the portion of the data 328 and/or 330. Notably, the system 300 may tag the data 328 and/or 330 to identify the one or more second or other entities that received or possess the data 328 and/or 330.

In some embodiments, the data exchange system 300 may perform further operations to transmit suggestions to manage, control, and/or limit the accesses 332, 334, 338, 340, 342, 344, 348, and/or 350 to the data exchange schemas 302 and/or 304. For example, the system 300 may transmit suggestions to the user based on how the data 316, 318, 320, 322, 324, 326, 328, and/or 330 may be used by the one or more entities 314, 336, and/or 346, among other possible entities. In particular, the system 300 may transmit suggestions to the user based on the entity 346 sending advertisements to the user based on the browse data 328 and/or the click data 330. Yet further, the system 300 may transmit such suggestions based on the external access 358 that one or more second or other entities may have to the browse data 328 and/or the click data 330, possibly resulting in additional advertisements sent to the user. Notably, in some instances, the system 300 may also determine the suggestions based on how merchants of the entities 314, 336, and/or 346 would like to receive data 316-330.

In one scenario, the accesses 344 and/or 350 of the one or more entities 346 to the portion of data 328 and/or 330 further enables one or more second or other entities to access the portion of data 328 and/or 330 based on a particular access rule 356 associated with the portion of the data 328 and/or the lack of an access rule associated with the portion of data 330. As such, the system 300 may perform operations including determining a suggested change to the particular access rule 356 and/or creating an access rule for the access 350 based on the one or more second entities with access to the portion of data 328 and/or 330. The notification transmitted to the client device as described above may further indicate the suggested change to the particular access rule 356 and/or the creation of the access rule for the access 350.

It should be noted that the data 316, 318, 320, 322, 324, 326, 328, and/or 330 in the one or more schemas 302 and/or 304 may change dynamically. Referring back to FIGS. 1B-3C, for example, the data exchange schema server 102 may change the data in such schemas based on various communications with other servers, including the user account server 164 and/or the communication servers 152 further including the web server 154, the API server 156, and/or the message server 158. In particular, the one or more schemas 302 and/or 304 may change dynamically based on the variability of the account data 318 deter lined by the system 300. For example, the user's medical history can change over time. Further, various changes may incur to the user's address, shipping address, billing address, work address, and/or telephone, among other characteristics involving the user may be determined from the user's changes to the account data 318. In one or more scenarios, the data exchange system 300 may perform operations including determining a change to the portion of data 316-330 accessible by the one or more entities 314, 336, and/or 346. Further, the system 300 may perform operations including determining second accesses or updated accesses of the one or more entities 314, 336, and/or 346 to the changed portion of data 316-330, where the second or updated accesses of the one or more entities 314, 336, and/or 346 may be based on a particular access rule of the access rules 352, 354, and/or 356 associated with the portion of data 316-330.

Figure 4A:
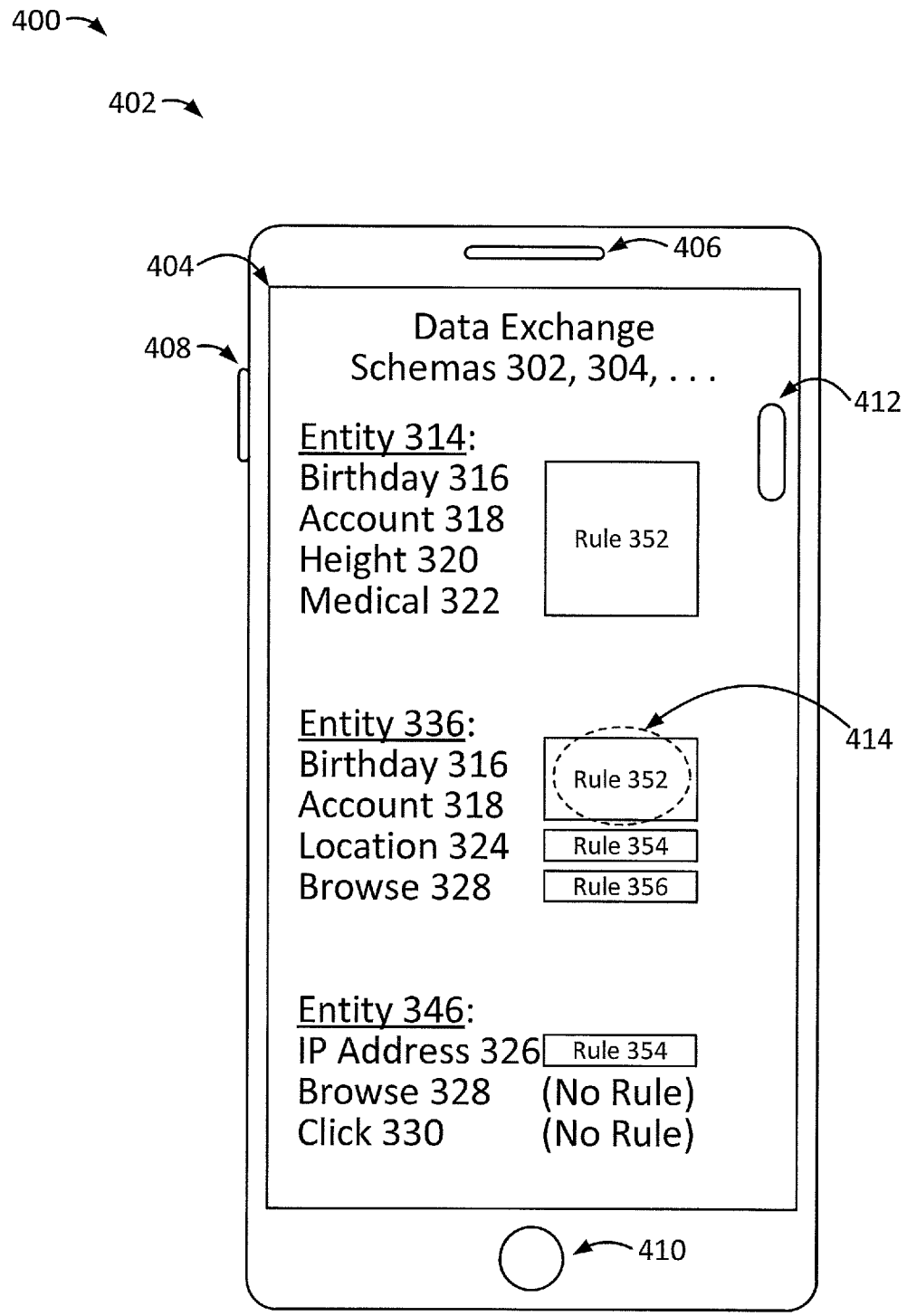
FIG. 4A illustrates an exemplary system with a client device, according to an embodiment.

FIG. 4A illustrates an exemplary system 400 with a client device 402, according to an embodiment. The system 400, possibly referred to a smartphone system 400, may include the aspects of the systems 100, 150, 200, and/or 300 described in relation to FIGS. 1A-3C. For example, the client device 402 may include one or more components of the client device 104 described above in relation to the FIGS. 1-3C.

As shown, the smartphone system 400 may include a display/graphical user interface 404. In particular, the graphical user interface 404 may provide the data exchange schemas 302, 304, and/or other schemas associated with a user. As such, the user may view the entities 314, 336, and/or 346 that have the accesses to the data 316, 318, 320, 322, 324, 326, 328, and/or 330, among other types of data associated with the data exchange schemas 302 and/or 304 described above in relation to FIGS. 3A-3C. Further, the user may view the various access rules 352, 354, and/or 356 associated with the data exchange schemas 302 and/or 304. As shown, the graphical user interface 404 may receive a touch input 414 to select a given rule. As illustrated, the rule 352 may be selected and/or the user may be able to view details of the rule 352. Further, the scroll bar 412 may be used to view other entities that may have access to data from the data exchange schemas 302 and/or 304.

The smartphone system 400 may also include a speaker/microphone 406, a side button 408, and/or a control button 410, among other possible hardware components. The smartphone system 400 may also include a non-transitory machine-readable medium having stored thereon machine-readable instructions executable to cause a machine, such as the smartphone system 400, to perform operations. The smartphone system 400 may also include one or more hardware processors that may take the form of the hardware processor 134 described above. The one or more hardware processors may be coupled to the non-transitory machine-readable medium and configured to read the instructions to cause the smartphone system 400 to perform operations.

In some embodiments, the operations may include determining one or more data exchange schemas 302 and/or 304 for a user, as described above in relation to FIGS. 3A-3C. As noted, each data exchange schema 302 and/or 304 includes one or more types of data 316-330 associated with the user. The operations may also include receiving a request from one or more entities 314, 336, and/or 346 for at least a portion of data 316-330 from at least one data exchange schema 302 and/or 304. For example, the portion of the data 316-330 requested may include a given type of data from the one or more types of data 316-330. In response to receiving the request from the one or more entities 314, 336, and/or 346, an access 332, 334, 338, 340, 342, 344, 348, and/or 350 for the one or more entities 314, 336, and/or 346 may be determined. For example, considering the scenario above with one or more entities 346 including an online store, the accesses 344 and/or 350 to the portion of data 328 and/or 330, respectively, may be determined based at least on the type of data in the portion of data 328 and/or 330. For example, the type of data may indicate user interactions with one or more browsers. The operations may include transmitting a notification to the client device 402 of the user that indicates the access 344 and/or 350 of the one or more entities 346 to the portion of data 328 and/or 330.

Notably, the user may access the data exchange schemas 302 and/or 304 with the graphical user interface 404 of the client device 404. As such, the user may have access to various types of the data 316-330 from a single view, possibly giving the user access to numerous types of data associated with the user. For example, the user may access the account data 318 to retrieve user names, passwords, PIN number, credit card numbers, frequent flyer mileage account numbers, and/or hotel reward account numbers, possibly other information that may be forgotten. In some instances, the control button 410 may include a fingerprint sensor to detect a fingerprint from one or more users to authenticate the user's access to such information. For example, one or more of the user's fingerprint inputs (e.g., thumb and index fingerprint inputs) may be provided to the control button 410 to retrieve such information.

In some embodiments, the operations of smartphone system 400 may include generating one or more of the data exchange schemas 302 and/or 304, possibly based on user inputs to the graphical user interface (GUI) 404. For example, the one or more of the data exchange schemas 302 and/or 304 may be generated by the data 316-330 shared based on inputs to the GUI 404. For example, the operations may include determining a data transfer with a web browser of the client device 402 and a remote server based at least on one or more touch inputs received from the GUI 404 of the client device 402. As such, the one or more data exchange schemas 302 and/or 304 may be determined based at least on the data transfer with the web browser of the client device 402.

Figure 4B:
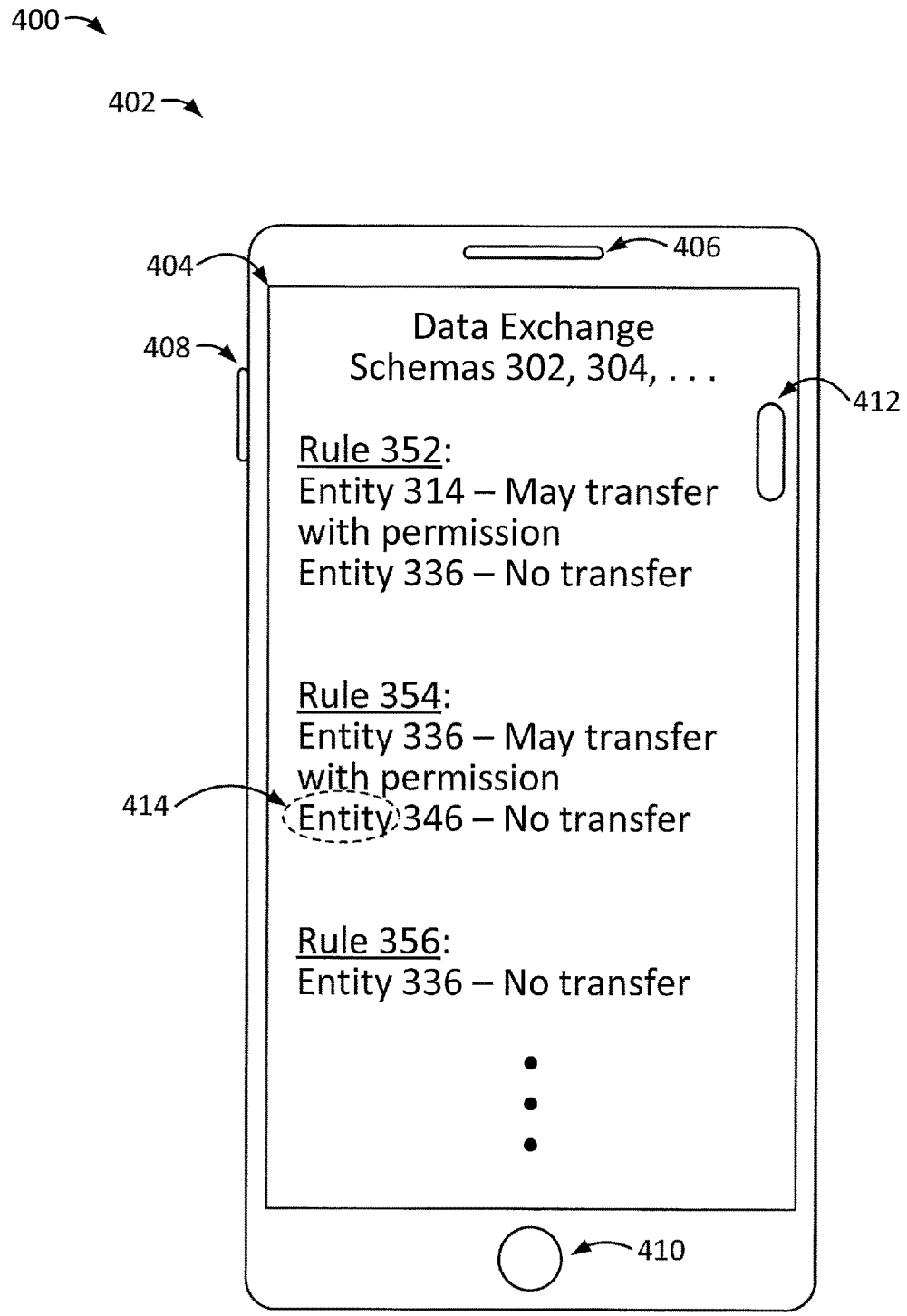
FIG. 4B illustrates an exemplary system with a client device, according to an embodiment.

FIG. 4B also illustrates the exemplary system 400 with the client device 402, according to an embodiment. As shown, the smartphone system 400 in FIG. 4B may take the form of the smartphone system 400 in FIG. 4A. As noted, the display/graphical user interface 404 may provide the data exchange schemas 302, 304, and/or other schemas associated with a user. Yet further, the GUI 404 may provide the various access rules 352, 354, and/or 356 associated with the data exchange schemas 302 and/or 304. In particular, the GUI 404 may provide various permissions or permission levels of the entities 314 and/or 336 to transfer data based on the rule 352. Further, the GUI 404 may provide various permission or permission levels of the entities 336 and/or 346 to transfer data based on the rule 354. Yet further, the GUI 404 may provide various permissions of the entity 336 to transfer data based on the rule 356. As shown, the scroll bar 412 may be used to view other rules and permissions of entities that may have access to data from the data exchange schemas 302 and/or 304.

In some embodiments, the user may create or modify the access rules 352, 354, and/or 356 with the GUI 404. For example, the user may modify the access rule 354 based on one or more user inputs to the GUI 404. In particular, the operations of the smartphone system 400 may include determining the one or more access rules 352, 354, and/or 356 associated with at least one of the data exchange schemas 302 and/or 304 based at least on one or more touch inputs 414 received from the GUI of the client device 402. For example, the one or more access rules 352, 354, and/or 356 may specify whether the entities 314, 336, and/or 346 may transfer the data 316-330, with or without permissions, and/or under which circumstances or purposes. As such, for example, the accesses 344 and/or 350 of the one or more entities 346 to the portion of data 328 and/or 330 may be determined based on the one or more access rules 356 determined.

Figure 4C:
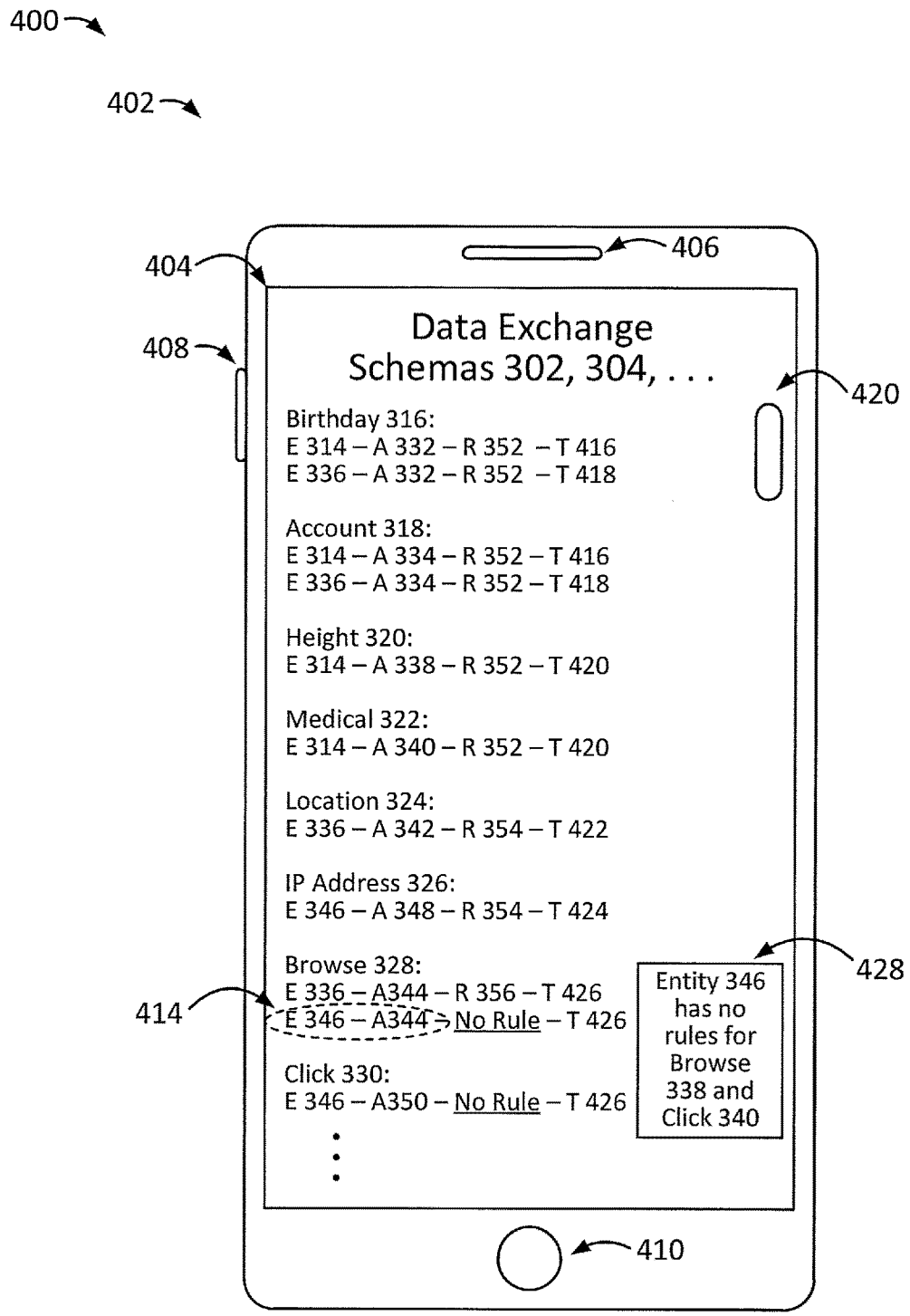
FIG. 4C illustrates an exemplary system with a client device, according to an embodiment.

FIG. 4C also illustrates the exemplary system 400 with the client device 402, according to an embodiment. As shown, the smartphone system 400 in FIG. 4C may take the form of the smartphone system 400 in FIGS. 4A and 4B. As noted, the display/graphical user interface 404 may provide the data exchange schemas 302, 304, and/or other schemas associated with a user. Further, the GUI 404 may provide the birthday data 316 and one or more entities 314 and/or 336 with the access 332 to the birthday data 316 based on the access rule 352. Yet further, the GUI 404 may also provide times 416 and/or 418 associated with the access 332 provided to the entities 314 and/or 336, respectively. For example, the access 332 may be provided to the entity 314 at a time 416, possibly based on the user entering the doctor's office. Further, the access 332 may be provided to the entity 336 at a time 418, possibly based on the user entering the store described above. As such, the GUI 404 may provide a log of times 416-426 associated with data accesses 332, 334, 338, 340, 342, 344, 348, and/or 350 provided to the various entities 314, 336, and/or 346.

As shown, the notification 428 may indicate that there are no rules associated with the entity 346 for accessing the browse data 338 and/or the click data 340. As such, the entity 346 may transfer the browse data 338 and/or the click data 340 to second or other entities, possibly with the external access 358 described above in relation to FIG. 3C-4B. As such, the GUI 404 may receive one or more user inputs 414 to set up one or more rules associated the access 344 of the entity 346 to the browse data 338 and/or the click data 340.

In addition, the GUI 404 may provide the account data 318 and the entities 314 and/or 336 with access 334 to the account data 318 based on the access rule 352. Yet further, the GUI 404 may also provide times 416 and/or 418 associated with the access 334 provided to the entities 314 and/or 336, respectively.

Further, the GUI 404 provides height data 320 and the entity 314 with access 338 to the height data 320 based on the access rule 352. Further, the GUI 404 may also provide time 420 associated with the access 338 provided to the entity 314. The GUI 404 also provides medical data 322 and the entity 314 with access 340 to the medical data 322 based on the access rule 352. Further, the GUI 404 may also provide time 420 associated with the access 338 provided to the entity 314. For example, access 338 and/or 340 may be provided to the entity 314 at the same time 420, possibly based on the user giving the entity 314 permissions to access 338 and/or 340 the data 320 and/or 322, respectively.

Yet further, the GUI 404 provides location data 324 and the entity 336 with access 342 to the location data 324 based on the access rule 354. Further, the GUI 404 may also provide time 422 associated with the access 342 provided to the entity 336. In addition, the GUI 404 provides the IP address data 326 and the entity 346 with access 348 to the IP address data 326 based on the access rule 354. Further, the GUI 404 may also provide time 424 associated with the access 348 provided to the entity 346.

Further, the GUI 404 may provide the browse data 328 and one or more entities 336 and/or 346 with the access 344 to the browse data 328, where the access 344 of the entity 336 is based on the access rule 356. Yet further, the GUI 404 may also provide time 426 associated with the access 344 provided to the entities 336 and/or 346, respectively. Yet further, the GUI 404 provides click data 330 and the entity 346 with access 350 to the click data 330. Further, the GUI 404 may also provide time 426 associated with the access 350 provided to the entity 346.

In some embodiments, the various access rules 352, 354, and/or 356 may be associated with the data exchange schemas 302 and/or 304. In particular, the GUI 404 may provide various permissions of the entities 314 and/or 336 to transfer data based on the rule 352. Further, the GUI 404 may provide various permission of the entities 336 and/or 346 to transfer data based on the rule 354. Yet further, the GUI 404 may provide various permissions of the entity 336 to transfer data based on the rule 356. As shown, the scroll bar 412 may be used to view other entities that may have access to data from the data exchange schemas 302 and/or 304.

In some embodiments, the smartphone system 400 may notify the user regarding the entities 314, 336, and/or 346 permitted to share the user's data. The smartphone system 400 may perform operations including determining one or more second or other entities that request the portion of the data 316-330 from the one or more entities 314, 336, and/or 346. The operations may include determining the one or more entities 314, 336, and/or 346 permitted to share the portion of data 316-330 to the one or more second or other entities based on one or more access rules 352, 354, and/or 356 determined for the portion of the data 316-330. In some instances, the notification 428 transmitted to the client device 402 may further indicates the one or more entities 314, 336, and/or 346 permitted to share the portion of data 316-330 to the one or more second or other entities based on one or more access rules 352, 354, and/or 356.

In some embodiments, the smartphone system 400 may perform operations including determining one or more access rules 352, 354, and/or 356 associated with the portion of the data 316-330 based on one or more touch inputs 414 received from the GUI 404 of the client device 402. The accesses 332, 334, 338, 340, 342, 344, 348, and/or 350 of the one or more entities 314, 336, and/or 346 to the portion of the data 316-330 may be determined based at least on the one or more rules 352, 354, and/or 356. The operations may also include determining a suggested change to the one or more access rules 352, 354, and/or 356 based on such accesses of the one or more entities 314, 336, and/or 346 to the portion of the data 316-330, where the notification 428 transmitted to the client device 402 may further indicate the suggested change to the one or more access rules 352, 354, and/or 356.

In some embodiments, referring back to FIGS. 3A-3C, the data exchange system 300 may activate an application, possibly an "app" installed on a client device. For example, the app may be configured to display the GUI 404 shown in FIGS. 4A-4C. Further, the app may be activated to alert the user with the notification 428. In some instances, the app may provide the one or more suggestions described above to implement rules for the accesses 344 and/or 350 of the entity 346, among other possibilities.

In some embodiments, the smartphone system 400 may recognize changes to the data exchange schemas 302, 304, and/or other schemas. For example, the smartphone system 400 may perform operations including determining a change to the portion of data 316-330 accessible by the one or more entities 314, 336, and/or 346. The operations may also include determining a second access or updates to the accesses 332, 334, 338, 340, 342, 344, 348, and/or 350 of the one or more entities 314, 336, and/or 346 to the changed portion of data. Further, the notification 428 transmitted to the client device 402 may further indicate a request to authorize the second access of the one or more entities 314, 336, and/or 346 to the changed portion of data. As such, user may authorize the second access to the changed portion of the data 316-330 accordingly.

Figure 5:
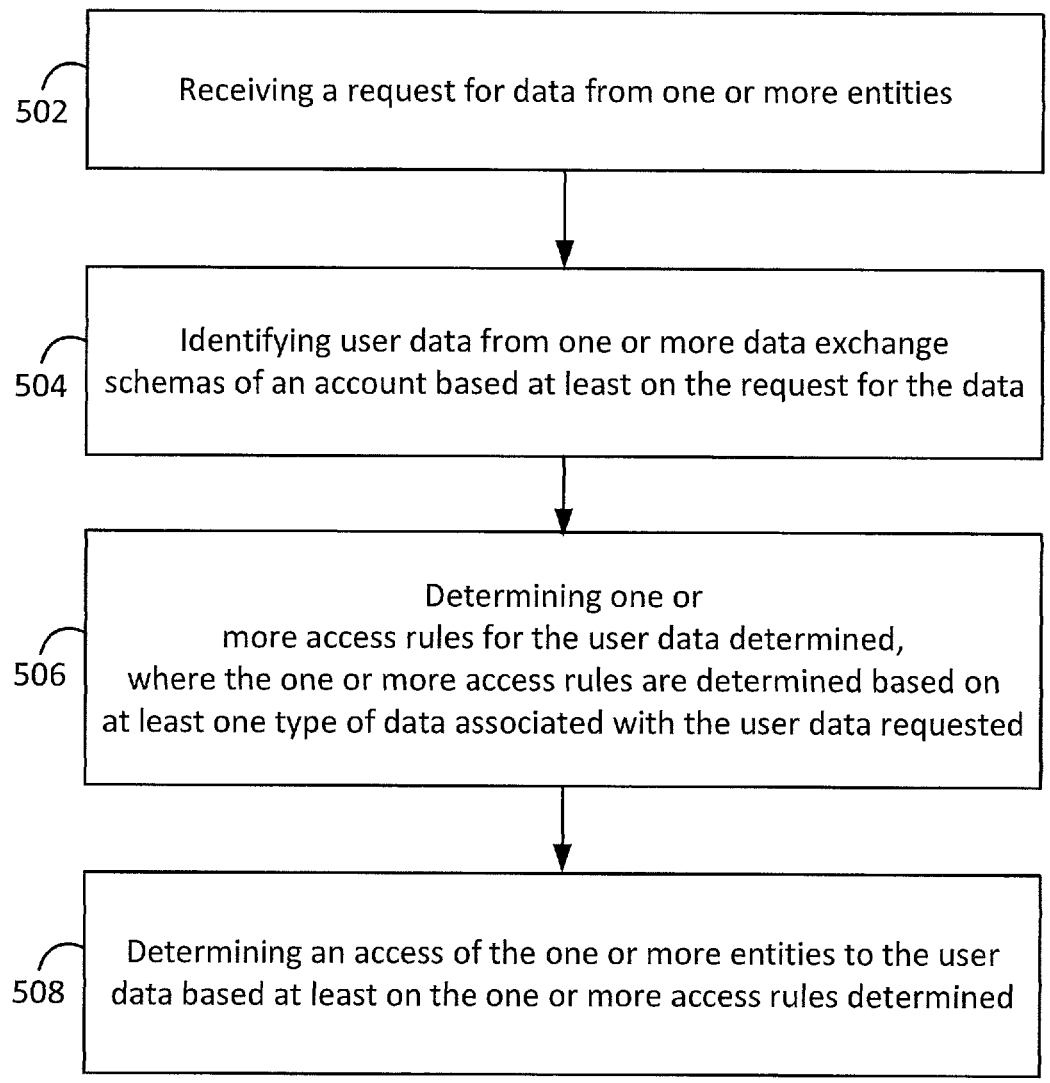
FIG. 5 illustrates an exemplary method, according to an embodiment.

FIG. 5 illustrates an exemplary method 500, respectively, according to an embodiment. Notably, one or more steps of the method 500 described herein may be omitted, performed in a different sequence, and/or combined with other methods for various types of applications contemplated herein.

As shown in FIG. 5, at step 502, the method 500 may include receiving a request for data from one or more entities. For example, referring back to FIGS. 1A-4C, the method 500 may include the data exchange server 102 receiving the request for data from the client device 106 of the one or more entities. As described above, the request may be embedded in the data/data packet 124 and received by the data exchange server 102 over the one or more networks 108 and/or the one or more communication servers 152.

At step 504, the method 500 may include identifying user data from one or more data exchange schemas of an account based at least on the request for the data. For example, referring back to FIGS. 1A-4C, the method 500 may include one or more hardware processors 112 identifying the user data. In particular, as shown in FIGS. 3A-3C, the user data 316-330 may be identified from the one or more data exchange schemas 302 and/or 304 of an account based on the request for the data.

At step 506, the method 500 may include determining one or more access rules for the user data determined, where the one or more access rules are determined based on at least one type of data associated with the user data requested. For example, referring back to FIGS. 1A-4C, the method 500 may include the one or more hardware processors 112 determining one or more access rules. In particular, as shown in FIGS. 3A-3C, the one or more access rules 352, 354, and/or 356, among other access rules described above may be determined.

At step 508, the method 500 may include determining an access of the one or more entities to the user data based at least on the one or more access rules determined. For example, referring back to FIGS. 1A-4C, the method 500 may include the one or more hardware processors 112 determining the access of the one or more entities. In particular, as shown in FIG. 3C, any one or more of the accesses 332, 334, 338, 340, 342, 348, 344, and/or 350 may be determined based on the access rules 352, 354, and/or 356, among other access rules described or contemplated above.

As noted, the one or more data exchange schemas 302 and/or 304 may be modified, refined, and/or reformed, possibly over time. For example, the data exchange schemas 302 and/or 304 may be modified based on the user purchasing items from a second entity, possibly another merchant store. As such, the method 500 may include the system 300 determining one or more data transfers with one or more second entities, possibly entities other than the entities 314, 336, and/or 346. As such, the one or more data exchange schemas 302 and/or 304 may be modified based on the one or more data transfers with the one or more second entities. For example, descriptions of the items, the costs of the items, and/or the quantities of the items purchased may be included in the one or more data exchange schemas 302 and/or 304.

In some embodiments, the user data may change, thereby affecting the accesses of the one or more entities to the changed user data. For example, in some instances, the one or more entities may or may not be given access to the changed user data. As such, the method 500 may include determining a change to one or more portions of the user data 316-330 accessible by the one or more entities 314, 336, and/or 334 based at least on the one or more access rules 352, 354, and/or 350 determined. Further the method 500 may include determining a second access of the one or more entities 314, 336, and/or 334 to the changed user data based at least on the access rules 352, 354, and/or 350 for the user data 316-330.

In some embodiments, the accesses 332, 334, 338, 340, 342, 344, 348, and/or 350 of the one or more entities 314, 336, and/or 346 to the user data 316-330 indicates one or more permissions of the one or more entities 314, 336, and/or 346 to share the user data 316-330. The method 500 may further include determining a data transfer of the one or more entities 314, 336, and/or 346 to share the user data 316-330. As noted, the online merchant (e.g., entity 346) may transfer the browse data 328 and/or the click data 330 to one or more second or other entities. As such, the method 500 may include determining a suggested change to the one or more access rules 352, 354, and/or 356 for the user data 316-330, possibly based on the one or more permissions of the one or more entities 314, 336, and/or 346 to share the user data 316-330.

Figure 6:
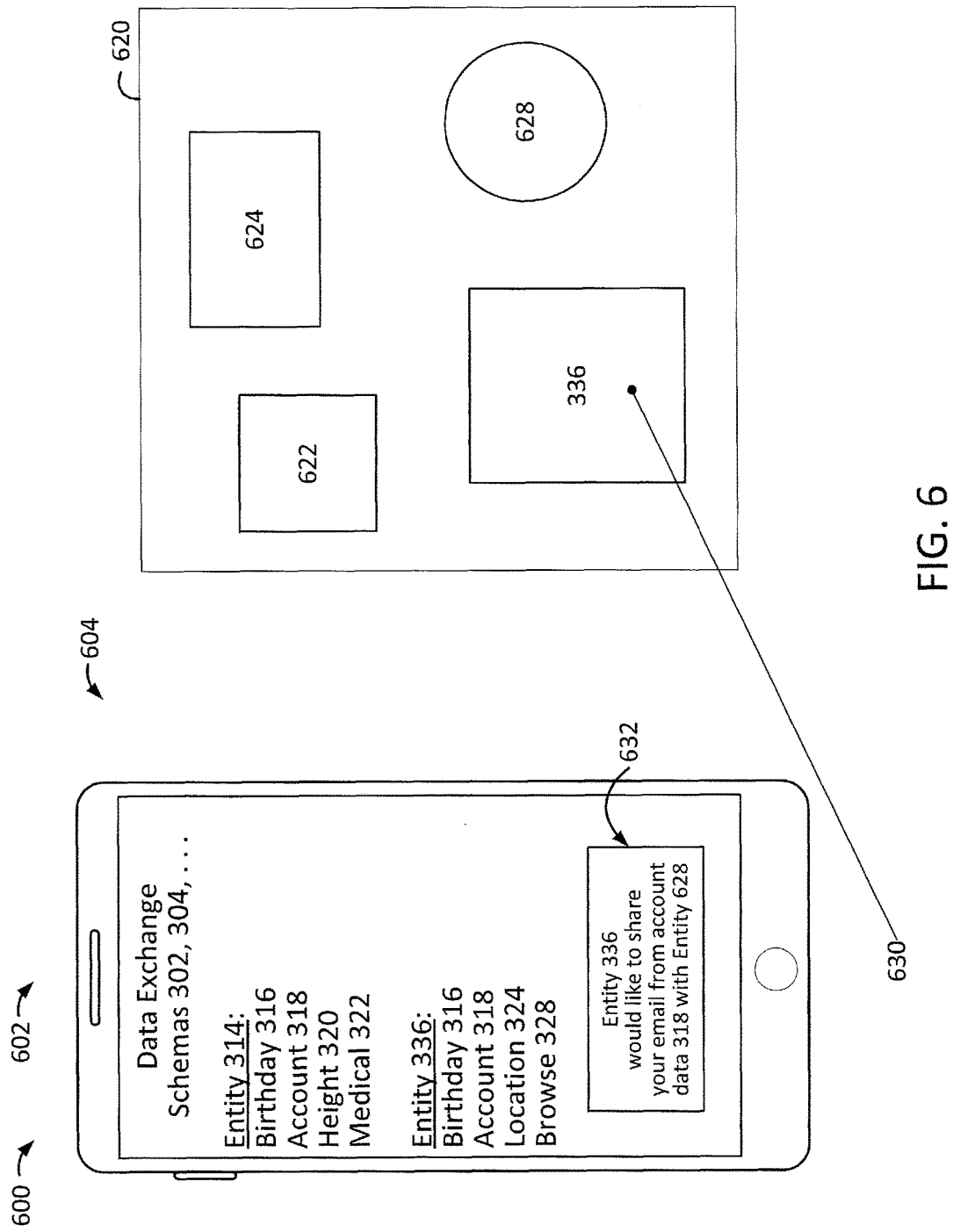
FIG. 6 illustrates an exemplary system with a client device, according to an embodiment.

FIG. 6 illustrates an exemplary system 600 with a client device 602, according to an embodiment. As shown, the client device 602 may take the form of the client device 402 described above in relation to FIGS. 4A-4C. For example, the client device 602 may include a graphical user interface (GUI) 604 that takes the form of the graphical user interface 404. Further, the GUI 604 may provide the data exchange schemas 302, 304, and/or other data exchange schemas associated with the user. Yet further, the GUI 604 may provide the entities 314 and/or 336 and their respective accesses to the data 316, 318, 320, 324, and/or 328. Yet further, the GUI 604 may be configured to receive the inputs that may take the form of the input 414 described above.

As shown, the client device 602 may be in a location 630 shown on the geographical map 620, shown for illustrative purposes. For example, the client device 602 may be proximate to the entities 622, 624, 336, and/or 628 shown on the geographic map 620 as buildings. In particular, the client device 602 may be at a location 630 within the building of the entity 336. In some instances, the one or more hardware processors (e.g., the processor 134) of the client device 602 may be configured to determine the location 630, possibly based on global positioning system (GPS) coordinates of the client device 602.

In some instances, the one or more hardware processors (e.g., processors 112 and/or 232) of the system 600 may determine the location 630 by retrieving data from the client device 602. For example, the location 630 may be determined by cellular protocol data, including GSM, CDMA, UMTS, EV-DO, WiMAX, or LTE data, and/or base station data, among other foams of data possibly available from the one or more data schemas 302 and/or 304. In addition, the location 630 may be further determined by sensor data, movement data (e.g., acceleration and/or velocity data) of the client device 602, temperature data, radio-frequency identifier (RFID) data, near-field communications (NFC) data, among other possible forms of data available from the one or more data schemas 302 and/or 304.

Referring back to FIG. 5, the method 500 may involve the user receiving notifications to receive incentives based on sharing data from the one or more data schemas 302 and/or 304. As shown in FIG. 6, for example, the notification 632 may indicate that the entity 336 would like to share the user's email address from the account data 318 with the entity 628. Further, the entity 336 may offer the user an incentive, such as a coupon, a gift, and/or a complementary item, possibly for sharing the email address.

For example, the method 500 may include determining an incentive obtainable from the one or more entities 336 based at least on the one or more entities 336 being permitted to share the user data, e.g., the email address from the account data 318, to one or more second entities 628. Further, the method 500 may include determining an indication from the client device 602 with access to the account to obtain the incentive. For example, the user may provide an input to share the email address to obtain the incentive. As such, the method 500 may include causing the email address from the user data 318 to be shared with the one or more second entities 628 based at least on the indication from the client device 502 to obtain the incentive.

Figure 7:
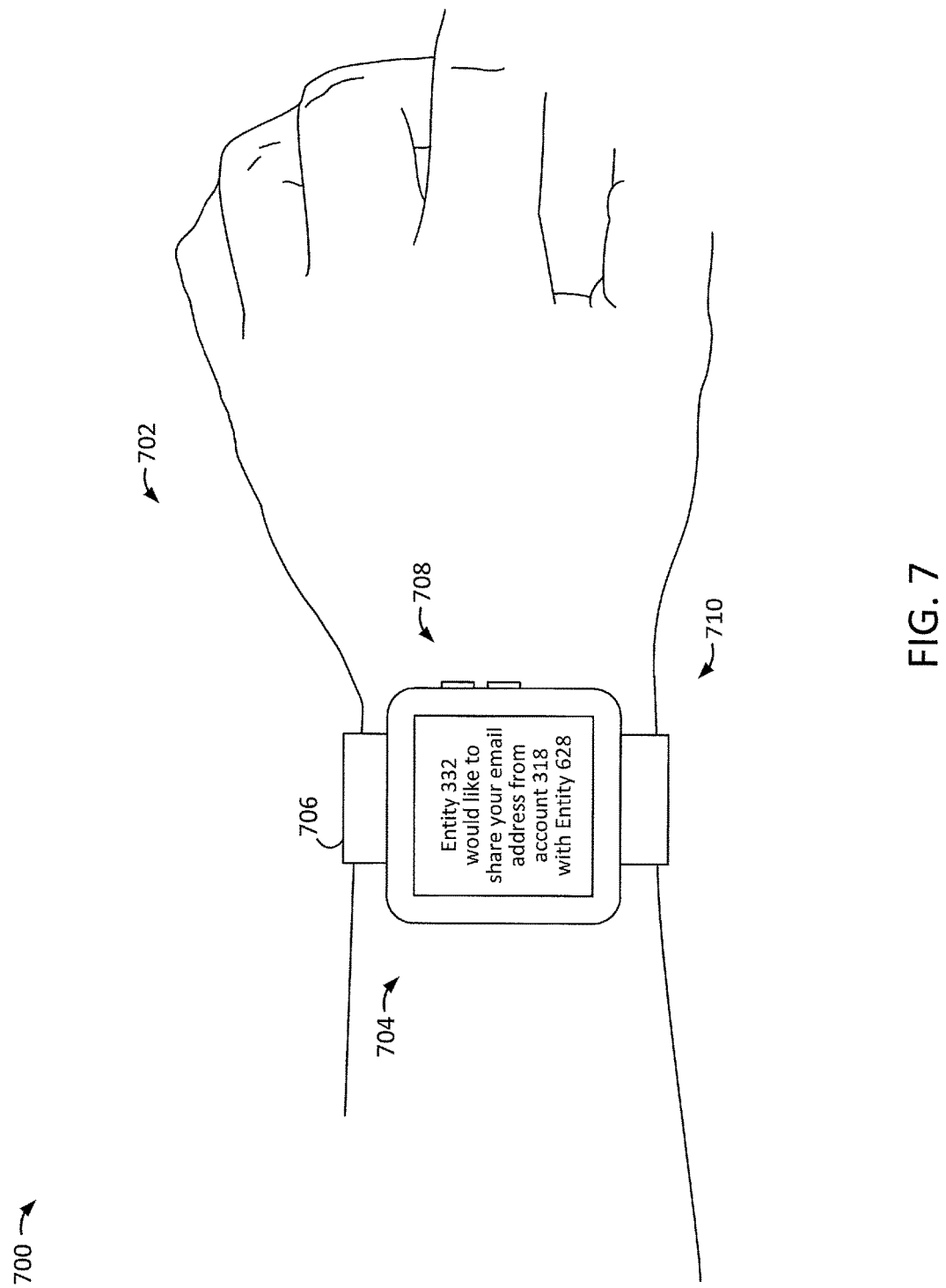
FIG. 7 illustrates an exemplary wearable computing device, according to an embodiment.

FIG. 7 illustrates an exemplary wearable computing device 700, according to an embodiment. As illustrated, the wearable computing device 700 may take the form of a smart watch. Further, the device 700 may include a graphical user interface (GUI) 704 that may include a smaller version of the GUI 604. Yet further, the wearable computing device 700 may include a wrist band 706 that secures around a user's wrist 702. In addition, the wearable computing device 700 may include a number of buttons 708 configured to control the GUI 704 and/or sensors 710. The sensors 710, possibly located on the inside surfaces of the wrist band 706, may be configured to receive a number of inputs associated with the user. For example, the one or more sensors 710 may include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs directly and/or indirectly from the user.

As shown, the GUI 704 may provide a notification. For example, referring back to FIG. 5, the method 500 may include transmitting a notification to the wearable device 700 with access to the user's account. The notification may indicate an incentive obtainable from the one or more entities 332 based at least on the one or more entities 332 being permitted to share the email address of the user data, e.g., the account data 318, to one or more second entities 628, among various other possible types of data.

The present disclosure, the accompanying figures, and the claims are not intended to limit the present disclosure to the example embodiments disclosed. As such, it is contemplated that various alternate embodiments and/or modifications to the embodiment disclosed, whether explicitly described or implied herein, are possible in light of the disclosure and/or the figures. Having thus described embodiments of the present disclosure, persons of ordinary skill in the art will recognize that changes may be made to the embodiments disclosed without departing from the scope of the present disclosure.

The invention claimed is:

1. A data exchange system, comprising:
a non-transitory memory; and
one or more hardware processors coupled to the non-transitory memory and configured to read instructions from the non-transitory memory to cause the data exchange system to perform operations comprising:
determining one or more data exchange schemas for a user, wherein each data exchange schema compiles one or more types of data associated with the user;
determining that a location of a client device of the user is associated with one or more first entities;
in response to determining that the location of the client device is associated with the one or more first entities, determining at least one data exchange schema from the one or more data exchange schemas based at least on the one or more first entities;
determining a set of access rights for the one or more first entities to access at least a portion of data from the at least one data exchange schema, wherein the set of access rights permits the one or more first entities to share the portion of data with one or more second entities;
determining that the portion of data is shared with the one or more second entities by the one or more first entities; and
transmitting a notification to the client device indicating (i) the set of access rights determined for the one or more first entities and (ii) that the portion of data is accessed by the one or more second entities.

2. The data exchange system of claim 1, wherein the operations further comprise:
retrieving a user schedule from the client device, wherein the set of access rights is determined further based on the the retrieved user schedule.

3. The data exchange system of claim 1, wherein the operations further comprise:
receiving one or more user inputs from a graphical user interface of the client device that indicate the one or more types of data, wherein the one or more ef data exchange schemas are determined based at least on the one or more types of data indicated from the one or more user inputs.

4. The data exchange system of claim 1, wherein the operations further comprise:
detecting a transfer of the data associated with a set of data types in a communication between the client device and a remote device associated with the one or more first entities; and
generating the at least one data exchange schema based at least on the set of data types.

5. The data exchange system of claim 1, wherein the at least one data exchange schema is associated with one or more access rules, and wherein the set of access rights determined for the one or more first entities to access the portion of data is determined based at least on a particular access rule from the one or more access rules.

6. The data exchange system of claim 5, wherein the one or more first entities is permitted to share the portion of data based at least on the particular access rule associated with the portion of data.

7. The data exchange system of claim 1, wherein the operations further comprise:
determining a change to the portion of data accessible by the one or more first entities; and
modifying the set of access rights for the one or more first entities to access the changed portion of data.

8. The data exchange system of claim 1, wherein the operations further comprise:
providing, to the client device, a suggested change to the set of access rights based at least on the determining that the portion of data is shared with the one or more second entities.

9. A non-transitory machine-readable medium having stored thereon machine-readable instructions executable to cause a machine to perform operations comprising:

determining one or more data exchange schemas for a user, wherein each data exchange schema is associated with one or more data types;

receiving a request from one or more entities for accessing at least a portion of data from at least one data exchange schema of the one or more data exchange schemas, wherein the portion of the data is associated with at least one data type from the one or more data types;

determining a set of access rights for the one or more entities to access the portion of data based at least on the at least one data type associated with the portion of data and one or more user inputs received from a graphical user interface of a client device of the user;

determining a suggested change to the set of access rights based on a determination that the portion of data is accessed by the one or more entities; and transmitting a notification to the client device of the user indicating (i) the set of access rights determined for the one or more entities to the portion of data and (ii) the suggested change to the set of access rights.

10. The non-transitory machine-readable medium of claim 9, wherein the operations further comprise:

detecting a data transfer between the client device and a remote server associated with the one or more entities based at least on one or more touch inputs received from the graphical user interface of the client device, wherein the at least one data exchange schema is determined based at least on the data transfer.

11. The non-transitory machine-readable medium of claim 9, wherein the operations further comprise:

determining the one or more entities is permitted to share the portion of data to one or more second entities based at least on the set of access rights, wherein the notification transmitted to the client device further indicates the one or more first entities is permitted to share the portion of data with the one or more second entities based at least on the set of access rights.

12. The non-transitory machine-readable medium of claim 9, wherein the operations further comprise:

detecting a change to the portion of data accessible by the one or more first entities; and modifying the set of access rights for the one or more first entities to access the changed portion of data.

13. A method to exchange data, comprising:

receiving a request for accessing data associated with a user account from one or more first entities;

identifying, from user data associated with the user account, a portion of the user data based on one or more data exchange schemas associated with the account;

determining a set of access rights for the one or more first entities to access the portion of the user data, wherein the set of access rights is determined based on at least one data type associated with the portion of the user data; and granting the one or more first entities access to the portion of the user data according to the set of access rights;

determining one or more data transfers between a client device associated with the user account and one or more second entities; and modifying the one or more data exchange schemas based at least on the data transfers.

14. The method of claim 13, further comprising:

detecting a change to the portion of the user data accessible by the one or more first entities; and modifying the set of access rights for the one or more first entities to access the portion of the user data based at least on the detected change.

15. The method of claim 13, wherein the set of access rights indicates a permission of the one or more first entities to share the portion of the user data, the method further comprising:

providing, on the client device, a suggested change to the set of access rights based at least on the permission of the one or more first entities to share the portion of the user data.

16. The method of claim 13, further comprising:

presenting, on the client device, an incentive obtainable by the user account on a condition that the one or more first entities is permitted to share the portion of the user data to with the one or more second entities;

receiving an indication from the client device to obtain the incentive; and causing the portion of the user data to be shared with the one or more second entities based at least on the received indication.

17. The method of claim 13, wherein the client device comprises a wearable device associated with the account.

18. The data exchange system of claim 1, wherein the operations further comprise:

determining a second set of access rights for the one or more first entities to access a second portion of data from the at least one data exchange schema, wherein the second set of access rights does not permit the one or more first entities to share the second portion of data with the one or more second entities.

19. The non-transitory machine-readable medium of claim 9, wherein the operations further comprise:

determining a second set of access rights for the one or more first entities to access a second portion of data from the at least one data exchange schema, wherein the second set of access rights does not permit the one or more first entities to share the second portion of data with the one or more second entities.

20. The method of claim 13, further comprising:

determining a second set of access rights for the one or more first entities to access a second portion of the user data based on the at least one data exchange schema, wherein the second set of access rights does not permit the one or more first entities to share the second portion of the user data with the one or more second entities.

* * * * *

UNITED STATES PATENT AND TRADEMARK OFFICE
CERTIFICATE OF CORRECTION

| | | |
|---|---|---|
| PATENT NO. | : 10,122,822 B2 | Page 1 of 1 |
| APPLICATION NO. | : 14/979920 | |
| DATED | : November 6, 2018 | |
| INVENTOR(S) | : Max Edward Metral | |

It is certified that error appears in the above-identified patent and that said Letters Patent is hereby corrected as shown below:

In the Specification

In Column 6, Line 33, change "font's" to --forms--.
In Column 8, Line 33, remove "a".
In Column 10, Line 46, change "thin" to --form--.
In Column 13, Line 6, change "foal" to --form--.
In Column 20, Line 57, change "deter lined" to --determined--.
In Column 26, Line 56, change "foams" to --forms--.

In the Claims

In Column 28, Line 31, remove "ef".
In Column 28, Line 37, remove "the".
In Column 29, Line 55, remove "and".
In Column 30, Line 5, change "on the data" to --on the one or more data--.
In Column 30, Line 25, remove "to".

Signed and Sealed this
Twenty-eighth Day of April, 2020

Andrei Iancu
*Director of the United States Patent and Trademark Office*